US012369000B2

(12) United States Patent
Chen et al.

(10) Patent No.: US 12,369,000 B2
(45) Date of Patent: Jul. 22, 2025

(54) ELECTRO-ACOUSTICAL TRANSDUCER DEVICE

(71) Applicant: TRANSDUCER STAR TECHNOLOGY INC., Hsinchu (TW)

(72) Inventors: Yu-Chen Chen, Hsinchu (TW); Chun-Kai Chan, Hsinchu (TW); Hsu-Hsiang Cheng, Hsinchu (TW); Ming-Ching Cheng, Hsinchu (TW)

(73) Assignee: Transducer Star Technology INC., Hsinchu (TW)

( * ) Notice: Subject to any disclaimer, the term of this patent is extended or adjusted under 35 U.S.C. 154(b) by 227 days.

(21) Appl. No.: 18/308,980

(22) Filed: Apr. 28, 2023

(65) Prior Publication Data

US 2024/0137709 A1 Apr. 25, 2024
US 2024/0236582 A9 Jul. 11, 2024

Related U.S. Application Data

(60) Provisional application No. 63/380,802, filed on Oct. 25, 2022.

(51) Int. Cl.
*H04R 17/00* (2006.01)

(52) U.S. Cl.
CPC .................................... *H04R 17/00* (2013.01)

(58) Field of Classification Search
CPC .. H04R 1/2803; H04R 1/2811; H04R 1/2834; H04R 7/08; H04R 17/00; H04R 17/005
See application file for complete search history.

(56) References Cited

U.S. PATENT DOCUMENTS

| | | | | |
|---|---|---|---|---|
| 4,530,138 | A * | 7/1985 | Ritter | H10N 30/886 156/286 |
| 5,798,599 | A * | 8/1998 | Harwood | B06B 1/0611 310/323.01 |
| 8,064,142 | B2 * | 11/2011 | Batchko | F03G 7/0665 359/666 |
| 11,043,197 | B1 * | 6/2021 | Liang | G10K 9/12 |
| 2018/0152782 | A1 * | 5/2018 | Christensen | H04R 1/2834 |
| 2019/0379978 | A1 * | 12/2019 | Lafort | H04R 7/02 |
| 2024/0056726 | A1 * | 2/2024 | Je | H04R 17/00 |
| 2024/0223963 | A1 * | 7/2024 | Ham | H04R 7/08 |

FOREIGN PATENT DOCUMENTS

| | | | |
|---|---|---|---|
| CN | 103347238 A | 10/2013 | |
| CN | 112261562 A * | 1/2021 | H04R 1/28 |
| CN | 114402449 A | 4/2022 | |
| TW | M632340 U | 9/2022 | |

* cited by examiner

*Primary Examiner* — Ryan Robinson
(74) *Attorney, Agent, or Firm* — Li & Cai Intellectual Property Office

(57) ABSTRACT

An electro-acoustical transducer device is disclosed, which includes: a hollow disk body that generally defines an axis of propagation, the hollow disk body comprising: a pair of plate members extending substantially perpendicular to the axis of propagation, each provided with a central transmitting port arranged about the axis of propagation, and a peripheral enclosure jointing the pair of plate members at the respective outer edge portions thereof, thereby defining a chamber of resonance between the pair of plate members; wherein a ring-opening about the axis of propagation that enables access to the chamber of resonance is formed between the central transmitting ports of the plate members.

19 Claims, 19 Drawing Sheets

ELECTRO-ACOUSTICAL TRANSDUCER DEVICE

CROSS-REFERENCES TO RELATED APPLICATIONS

This application claims the benefit of U.S. Provisional Patent Application No. 63/380,802 filed on Oct. 25, 2022, which is thereby incorporated by reference herein and made as part of specification.

BACKGROUND

Technical Field

The instant application pertains to the field of electro-acoustic transducing device. In some implementations, an exemplary transducer comprises a small form factor piezoelectric sound generating member with expanded output frequency range.

Description of the Related Art

Acoustic transducers, which play an important role of converting electrical signals into sound signals, have been an integral component for modern multimedia devices, e.g., free-field sound devices such as integrated or standalone speakers, or pressure field sound devices such as earphones. With the continuous quest for form factor reduction in portable multimedia devices, it has been a challenge to shrink the size of sound generating components while maintaining/improving the output capabilities thereof to ensure sound quality.

Various types of sound generating devices have been available (e.g., electromagnetic type, micro-electro-mechanical system (MEMS) type, etc.), each being capable of exhibiting different performance characteristics. For example, MEMS type transducers possess advantages of high consistency, low power consumption, and small size compared with conventional voice coil speakers. MEMS type transducers often incorporate solid-state (e.g., piezoelectric) materials suitable for integrated fabrication into miniature functional structures (e.g., suspended silicon structure with thin film piezoelectric actuator); they may also be adaptively configured into planar or 3-dimensional structures.

The MEMS type transducer in a planar structure configuration, which already favors form factor reduction, often utilizes acoustic driving components (e.g., piezoelectric plate) coupled with vibration and sound-generating components (e.g., elastic/resonating membrane). However, the vibration components in the planar configuration sometimes restricts the deformation of the acoustic driver component, such that the overall amplitude of displacement is reduced. This affects the audio output quality and limits the acoustic performance of a transducer device. On the other hand, while a 3-dimensional configuration often decouples the driver and the vibration components, the overall stability is often reduced due to the inclusion of additional transmission parts, which may be prone to the induction of unstable modes that affects the output sound quality. Such arrangement may also render the transducer device more susceptible to fall failure, weaker in structural stability, and thus results in poor reliability.

SUMMARY

Arrangements of the instant disclosure relates to an electro-acoustical transducer device that includes: a hollow disk body that generally defines an axis of propagation, the hollow disk body comprising: a pair of plate members extending substantially perpendicular to the axis of propagation, each provided with a central transmitting port arranged about the axis of propagation, and a peripheral enclosure jointing the pair of plate members at the respective outer edge portions thereof, thereby defining a chamber of resonance between the pair of plate members; wherein a ring-opening about the axis of propagation that enables access to the chamber of resonance is formed between the central transmitting ports of the plate members.

Arrangements of the instant disclosure further relates to an electro-acoustical transducer device that includes: a first transducer component comprising a hollow disc body that defines a chamber of resonance, wherein the hollow disc body generally defines an first axis of propagation, the hollow disc body, and includes an active sound generation member provided with a central transmitting port arranged about the first axis of propagation and enabling access to the chamber of resonance; and a second transducer component arranged on the active sound generation member and generally defines a second axis of propagation, wherein the first axis of propagation and the second axis of propagation are substantially in coaxial alignment.

BRIEF DESCRIPTION OF THE DRAWINGS

So that the manner in which the above recited features of the present disclosure can be understood in detail, a more particular description of the disclosure, briefly summarized above, may be had by reference to arrangements, some of which are illustrated in the appended drawings. It is to be noted, however, that the appended drawings illustrate only typical arrangements of this disclosure and are therefore not to be considered limiting of its scope, for the disclosure may admit to other equally effective arrangements.

DETAILED DESCRIPTION

Figure 1:
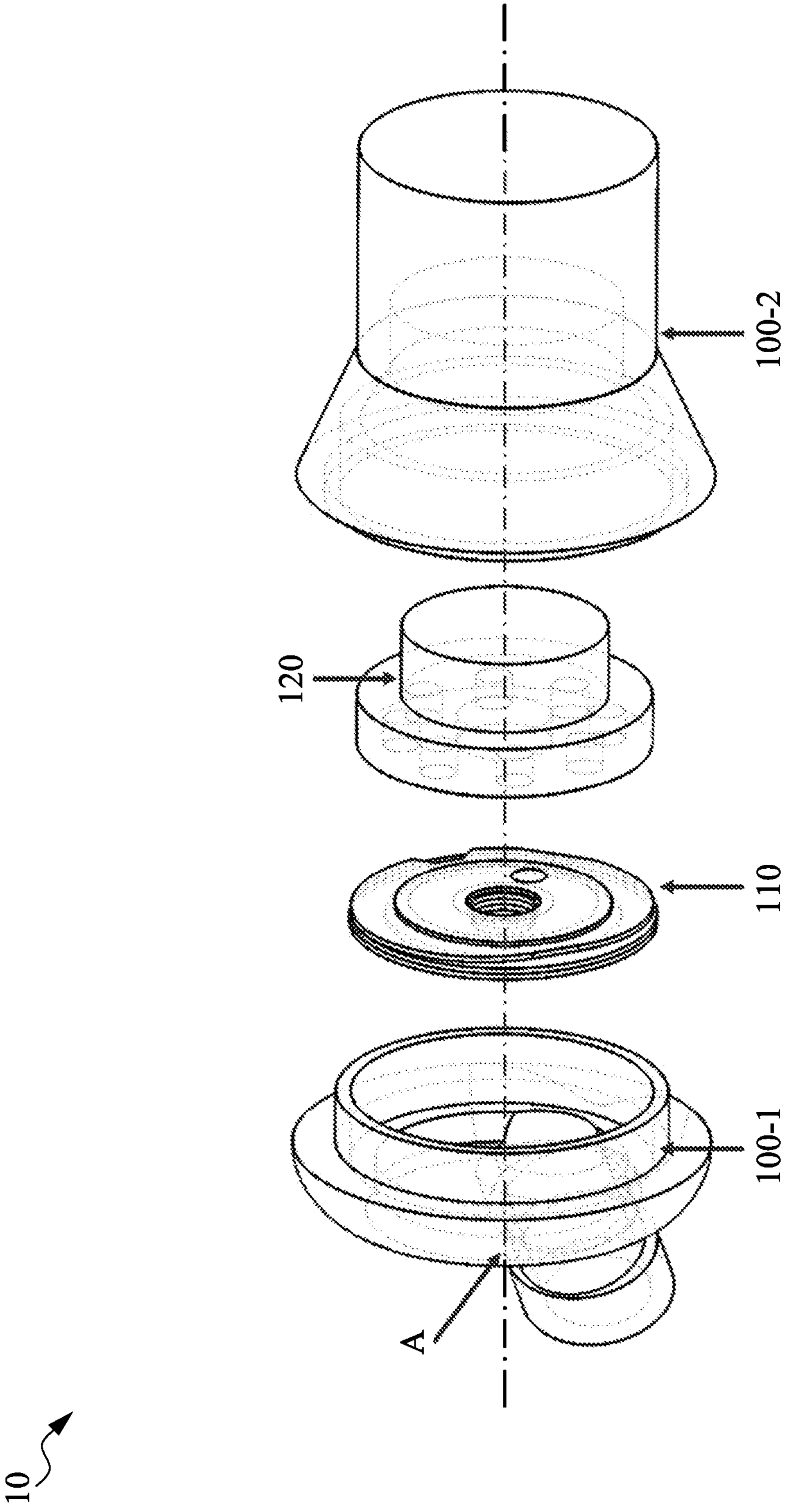
FIG. 1 is an exploded depiction showing components of an exemplary electro-acoustical transducer device in accordance with some arrangements of the instant disclosure.

The present disclosure will now be described more fully hereinafter with reference to the accompanying drawings, in which example arrangements of the disclosure are shown. This disclosure may, however, be embodied in many different forms and should not be construed as limited to the example arrangements set forth herein. Rather, these example arrangements are provided so that this disclosure will be thorough and complete, and will fully convey the scope of the disclosure to those skilled in the art. Like reference numerals refer to like elements throughout.

The terminology used herein is for the purpose of describing particular example arrangements only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

As used herein, the term "substrate" generally refers to a base material or construction upon which additional materials are formed. In some examples, on a micro component level, a substrate may refer to a semiconductor substrate, a base semiconductor layer on a supporting structure, a metal electrode, or a semiconductor substrate having one or more layers, structures or regions formed thereon. The substrate may be a conventional silicon substrate or other bulk substrate comprising a layer of semiconductor material. On a macro package level, a substrate may refer to components that provide structural support and enable signal connection for other functional device components, such as a printed circuit board (PCB).

As used herein, the term "configured" refers to a size, shape, material composition, material distribution, orientation, and arrangement of one or more of at least one structure and at least one apparatus facilitating operation of one or more of the structure and the apparatus in a predetermined way.

As used herein, the terms "longitudinal," "vertical," "lateral," and "horizontal" are defined with reference to a major plane of a substrate (e.g., base material, base structure, base construction, etc.) in or on which one or more structures and/or features are formed and are not necessarily defined by earth's gravitational field. A "lateral" or "horizontal" direction is a direction that is substantially parallel to the major plane of the substrate, while a "longitudinal" or "vertical" direction is a direction that is substantially perpendicular to or traverses the major plane of the substrate. The major plane of the substrate is defined by a surface of the substrate having a relatively large area compared to other surfaces of the substrate. In some examples, the major plane is shown to be horizontal on the figures of the present disclosure.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if the arrangements of the components are inverted in the figures, elements described as "below" or "beneath" or "under" or "on bottom of" other elements or features would then be oriented "above" or "on top of" the other elements or features. Thus, the term "below" can encompass both an orientation of above and below, depending on the manner in which the element is depicted in the figures, which will be evident to one of ordinary skill in the art.

As used herein, the terms "connect," "connected," and "connection" refer to an operational coupling or linking. Connected components can be directly coupled to one another or can be indirectly coupled to one another, such as through another set of components.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels of the manufacturing operations described herein. For example, "substantially all" typically refers to at least 90%, at least 95%, at least 99%, and at least 99.9%.

As used herein, the terms "electrically conductive" and "electrical conductivity" refer to an ability to transport an electric current. Electrically conductive materials typically correspond to those materials that exhibit little or no opposition to flow of an electric current. One measure of electrical conductivity is in terms of Siemens per meter ("S·m^−1"). Typically, an electrically conductive material is one having a conductivity greater than about 104 S·m^−1, such as at least about 105 S·m^−1 or at least about 106 S·m^−1. Electrical conductivity of a material can sometimes vary with temperature. Unless otherwise specified, electrical conductivity of a material is defined at room temperature.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure.

FIG. 1 is an exploded depiction showing components of an exemplary electro-acoustical transducer device in accordance with some arrangements of the instant disclosure. For example, the illustrated transducer device 10 takes the form of an insertion-type earphone. From left to right of the exemplary illustration, the transducer device 10 is provided with a first (e.g., frontal) housing member 100-1 for interfacing a user's pinna; a first transducer component (e.g., a high frequency acoustic unit) 110; a second transducer component (e.g., a low frequency acoustic unit) 120; and a second (e.g., rear) housing member 100-2. The first housing member 100-1 may be provided with a protruding earbud member (e.g., illustrated in a skewed/angled arrangement in the exemplary arrangement) that defines a front chamber for interfacing a user's external auditory canal. The second housing member 100-2 may form a back chamber for accommodating additional device components, e.g., a bluetooth module for a wireless earphone setup or signal cable components for a wired configuration.

In the exemplary arrangement, each of the first and second transducer components 110, 120 comprises a substantially planar construction. For instance, the first transducer component 110 comprises a generally disc-shape body having a hollow central region with a relatively thin profile (e.g., a higher radius to thickness ratio). Moreover, an axis of propagation of the acoustic output (e.g., axis A) is substantially defined perpendicular to the planar body through the hollow central hole. Furthermore, the planar body of the exemplary first transducer component 110 is substantially geometrically symmetrical about the axis of propagation (e.g., axis A).

The exemplary second transducer component 120 comprises a generally cylindrical disc body with a thicker profile. The axis of propagation of the second transducer component is also defined substantially perpendicular to the disc body thereof through its central region. As shown in the illustrated arrangement, the axes of propagation of the first transducer component 110 and the second transducer component 120 are arranged substantially in coaxial alignment (e.g., collectively shown as axis A). In some arrangements, the disc/plate bodies of the transducer components possess substantial geometric symmetry (e.g., the circular planar profile of the illustrated arrangement possesses a high degree of symmetry about the axis of propagation A), and thus the axes of propagation pass substantially through the respective geometric centers of the transducer components 110, 120. However, perfect geometric symmetry is not mandatory. In some instances (e.g., the exemplary first transducer component 110), while the central sound resonant portion of the transducer is provided with higher degree of geometric symmetry, the outer portion (e.g., the outer rim portion) thereof need not be so (e.g., the unsymmetrical arrangement of a visible notch around the edge region).

The first and the second transducer components 110, 120 may comprise different types of sound generating units with different operational principles and performance characteristics. For example, in some arrangements, the first transducer component 110 may comprise a piezoelectric acoustic unit specialized in higher range of the output frequency spectrum. In contrast, the second transducer component 120 may be a MEMS type acoustic unit configured for mid-range frequency output, a coil-type acoustic unit devoted for low frequency range output, or a balance-armature. Particularly, small form factor of the transducer components, e.g., piezoelectric type or MEMS type acoustic units, may be realized through modern semiconductor fabrication techniques. In the illustrated example, the higher frequency first transducer component 110 is arranged closer toward a wearer's eardrum, while the lower frequency second transducer component 120 is arranged further away from the wearer's ear.

It is noted that, while the illustrated embodiment is shown to be manifested in a miniature insertion-type earphone device, the arrangement of the instant disclosure may be adopted in other applications, such as headsets, mobile phones, laptop speakers, or even stand-alone sound generating devices, in various dimensions that suits a particular application specification.

Figure 2:
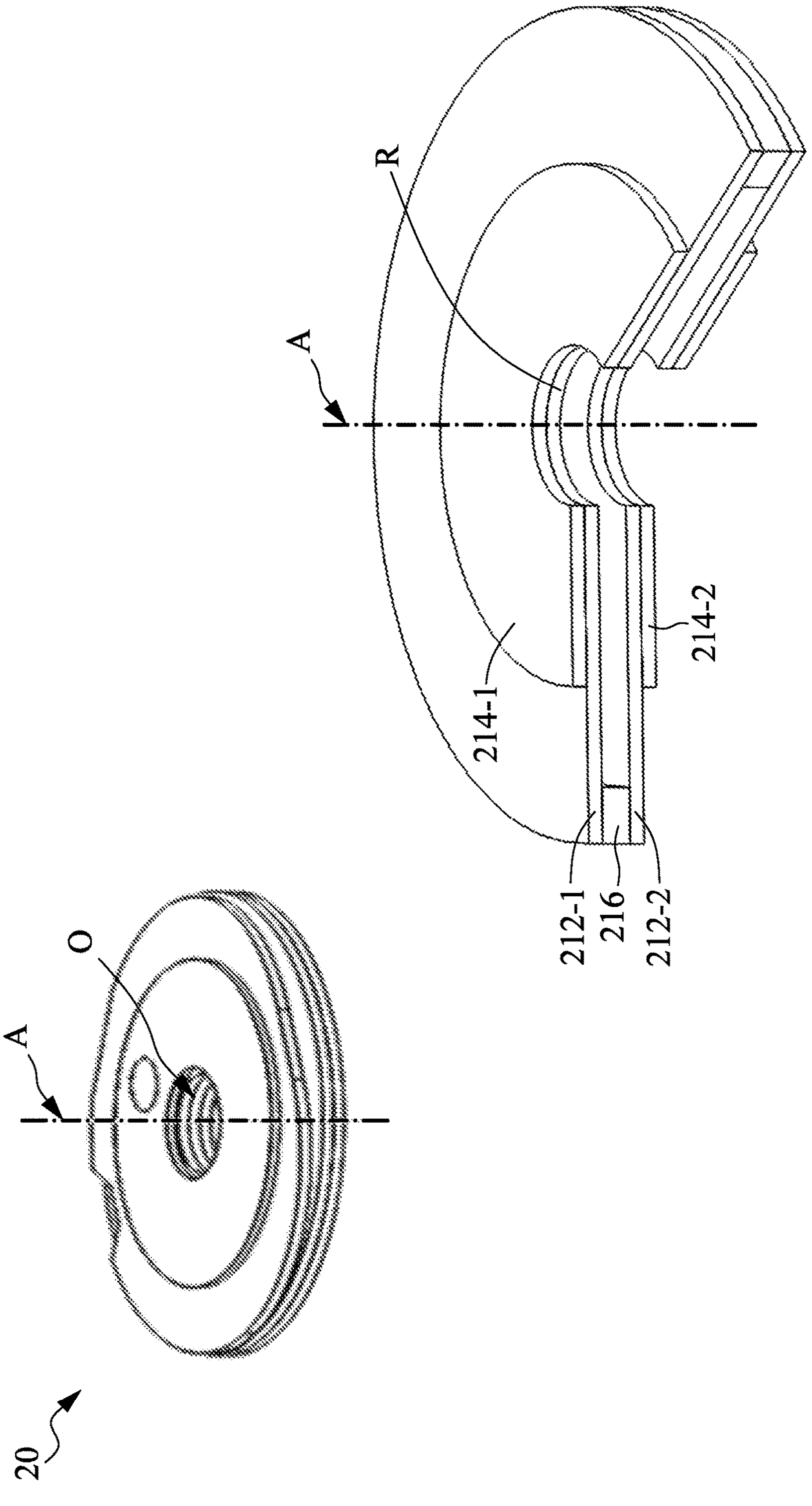
FIG. 2 illustrates an isometric and a partial cutaway enlargement view of an exemplary transducer component for an electro-acoustical transducer device in accordance with some arrangements of the instant disclosure.

FIG. 2 illustrates an isometric and a partial cutaway enlargement view of an exemplary transducer component for an electro-acoustical transducer device in accordance with some arrangements of the instant disclosure. For example, FIG. 2 illustrates an electro-acoustical transducer device 20 and a partial cutaway depiction of the exemplary transducer components thereof.

The exemplary electro-acoustical transducer device 20 comprise a hollow disc body that generally defines an axis of propagation A. For instance, while not possessing a perfect geometric symmetry, the hollow disc body of the exemplary transducer device 20 resumes a substantially circular planar shape with a hole formed at the center region thereof, such that an imaginary line A through the central hole (i.e., axis of acoustic output/propagation) substantially coincides with an axis of symmetry of the hollow disc body. In some arrangements, the transducer device 20 may correspond to the first transducer component 110 shown in FIG. 1.

The hollow disc body of the illustrated transducer device 20 comprises a pair of plate members 212-1, 212-2 extending substantially perpendicular to the axis of propagation A.

In the illustrated example, the planar profile of the plate members is circular, whose geometric center conveniently defines the axis of propagation. However, other planar profiles may be adopted for different application requirements. In some applications, convex polygonal shapes may be used. It is noted that a perfect geometrical symmetry may not be mandatory.

In some implementations, each of the plate members 212-1, 212-2 is provided with a central transmitting port O arranged about the axis of propagation A. The hollow disc body of the transducer device 20 further comprises a peripheral enclosure (e.g., ring spacer 216) jointing the pair of plate members 212-1, 212-2 at their respective outer edge portions, thereby forming a chamber of resonance therebetween. Accordingly, a ring-opening R is formed between the central transmitting ports O of the plate members 212-1, 212-2 about the axis of propagation A, which enables access to the chamber of resonance. From an external point of view through the central transmitting port O, the ring-opening R may resemble a slit with an annular profile, which permits fluid communication into the chamber of resonance defined between the plate members 212-1, 212-2.

In some implementations, at least one of the plate members 212-1, 212-2 is an active sound generation member. In some implementations, an active sound generation member comprises a piezoelectric member attached to a resonating plate. For example, the exemplary transducer device 20 is shown to possess a pair of active sound generation members.

In some implementations, each of the active sound generation member includes a plate member (e.g., plate members 212-1, 212-2) as depicted above, and further comprises a piezoelectric member 214-1 (or 214-2) having a circular disc body with a central hole formed therein in correspondence to the central transmission port O depicted above. The plate members 212-1, 212-2 would function as acoustic membranes (e.g., resonating plates), which may be driven to vibrate by the piezoelectric members 214-1, 214-2 upon the application of electrical voltage, thereby constituting a unimorph structure for generating acoustic output In some implementations, each active sound generation member may be provided with a pair of piezoelectric members respectively arranged on each planar surface of the plate member, thereby constituting a bimorph structure for enhanced sound driving performance.

The piezoelectric member 214-1, 214-2 may comprise piezoelectric material that exhibits piezoelectricity behavior, which may be driven to expand or contract (vibrate) by the application of electrical voltage. Exemplary material may include piezoelectric ceramics such as lead zirconate titanate (PZT), barium titanate, and lead titanate, gallium nitride, zinc oxide. Organic polymers, such as PVDF, or ferroelectrics materials with perovskite-structure (e.g., BaTiO3 [BT], (Bi½Na½) TiO3 [BNT], (Bi½K½) TiO3 [BKT], KNbO3 [KN], (K, Na) NbO3 [KNN]) may also be applicable. The resonating plate may comprise elastic materials capable of being driven to generate vibrations. Suitable material for the resonating plate may comprise metals/alloys that can withstand stamping or impact molding processes.

In the illustrated example, the exemplary transducer device 20 comprises a hollow disc body that generally defines an axis of propagation A. The exemplary hollow disc body comprises a pair of plate members 212-1, 212-2, each extending substantially perpendicular to the axis of propagation A. Moreover, each of the plate members 212-1, 212-2 is provided with a central transmitting port O arranged about the axis of propagation. The hollow disc body of the transducer device 20 further comprises a peripheral enclosure (e.g., ring spacer 216) jointing the pair of plate members 212-1, 212-2 at the respective outer edge portions thereof, thereby defining a chamber of resonance between the pair of plate members. A ring-opening R about the axis of propagation A that enables access to the chamber of resonance is formed between the central transmitting ports O of the plate members 212-1, 212-2. The exemplary transducer device 20 further comprises a pair of active sound generation members. Each of the active sound generation members includes a driving member (e.g., piezoelectric member 214-1, 214-2) attached to a resonating plate (e.g., plate member 212-1/212-2).

Figure 3:
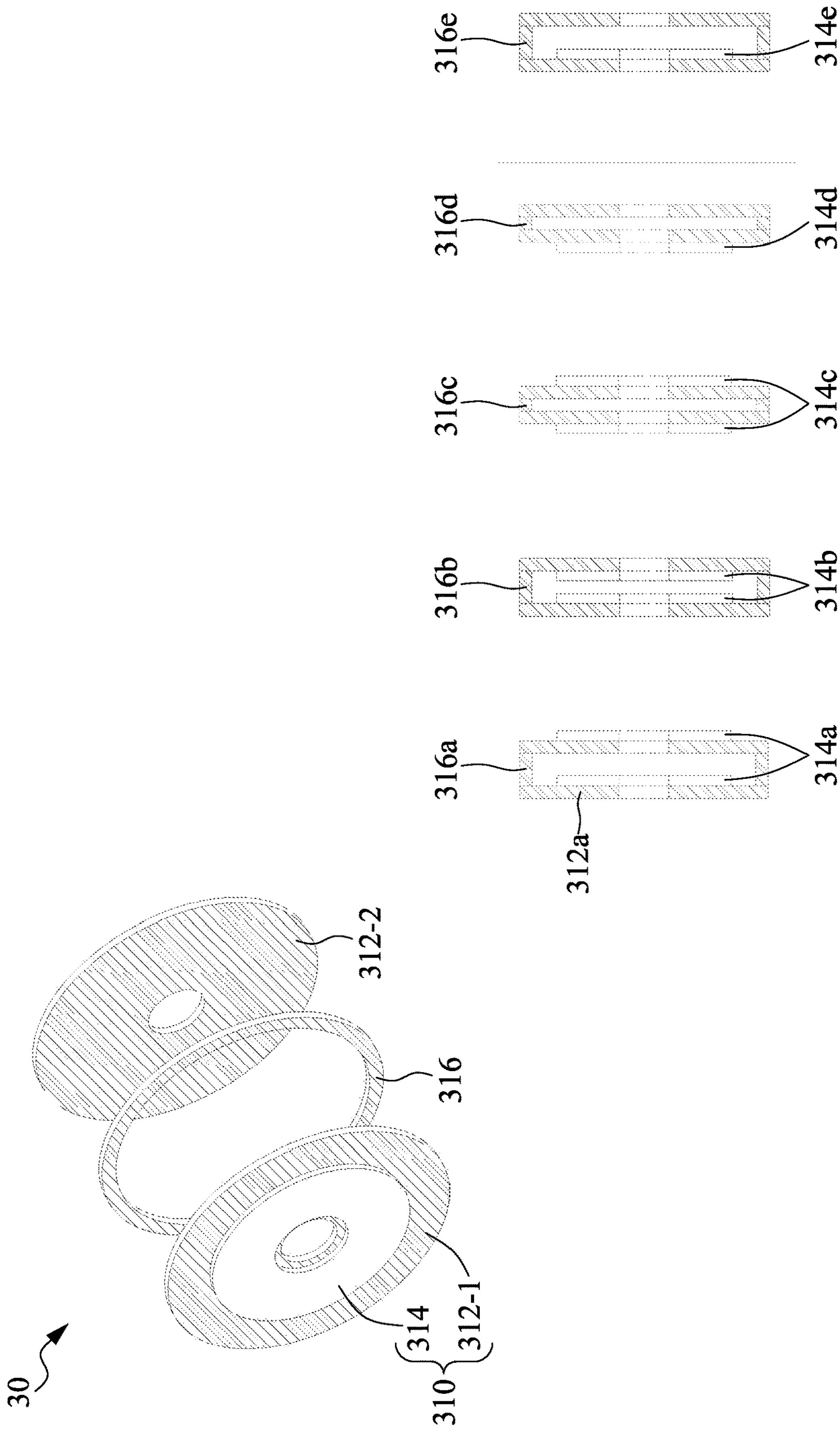
FIG. 3 depicts various assembly configurations of an exemplary transducer component for an electro-acoustical transducer device in accordance with some arrangements of the instant disclosure.

FIG. 3 depicts various assembly configurations of an exemplary transducer component for an electro-acoustical transducer device in accordance with some arrangements of the instant disclosure. For example, FIG. 3 shows various structural configurations for the hollow disc body of an electro-acoustical transducer device 30 utilizing a flat plate arrangement.

In some arrangements, the hollow disc body of the transducer device 30 is constructed essentially out of a pair of substantially flat plate members (which may be comprised of, among other things, resonating plates 312-1, 312-2). The exemplary transducer device 30 is provided with at least one active sound generation member 310, which is constructed essentially of the resonating plate 312-1 and a driving member 314. In some arrangements, the driving member 314 and the resonating plate 312-1 both possess substantially annulus planar profiles. In some arrangements, an outer diameter of the resonating plate 312-1 is greater than an outer diameter of the driving member 314. In some arrangements, the driving member 314 and the resonating plate 312-1 are substantially concentrically coupled to each other.

In some arrangements, a ring spacer 316 may be used between the pair of resonating plate 312-1, 312-2 to cooperatively form a chamber of resonance. A thickness of the ring spacer 316 may be tuned to create a chamber of resonance that functions in correspondence with a desired operational output frequency range. Accordingly, an outer surface of the ring spacer 316 at least partially forms an outer periphery enclosure of the hollow disc body. For instance, the outer circumferential surface of the exemplary ring spacer 316 would constitute (at least partly) the side/lateral surface of the substantially planar hollow disc body of the transducer device 30. The periphery of the above-mentioned components may be structurally joined by gluing (e.g., epoxy) or welding (e.g., laser welding). It is noted that, while the illustrated example exhibits high degree of geometric symmetry (e.g., concentric circular), it may not be a stringent requirement in some practical applications.

The number and the placement of the driving member (e.g., piezoelectric member 314) may adopt various different arrangements, depending on the performance or other application requirements. For instance, for higher performance requirements, a twin driving member configuration may be utilized (as shown by the driving member pairs 314*a*/314*b*/314*c*). In such instances, the driving members (e.g., members 314*a*/314*b*/314*c*) may reside either within or outside the chamber of resonance. Moreover, the thickness of the ring spacer (e.g., spacers 316*a*/316*b*/316*c*) may be tuned in correspondence to accommodate the placement of the driving member pairs. On the other hand, for applications that are budget or dimension conscious, a single driving member setup may be utilized (as shown by the sole driving member setup 314*d*/314*e*).

Figure 4:
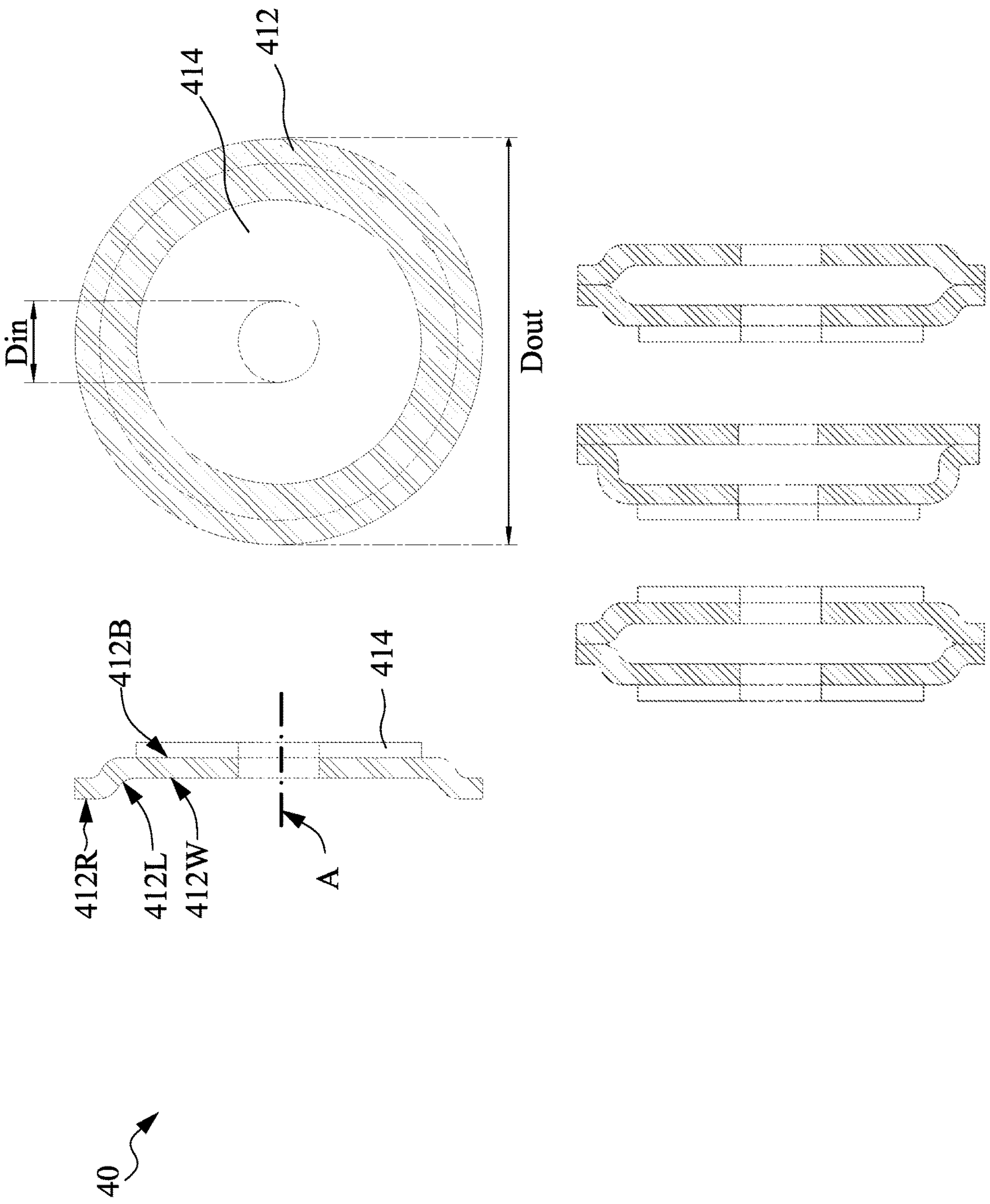
FIG. 4 depicts various assembly configurations of an exemplary transducer component for an electro-acoustical transducer device in accordance with some arrangements of the instant disclosure.

FIG. 4 depicts various assembly configurations of an exemplary transducer component for an electro-acoustical transducer device in accordance with some arrangements of the instant disclosure. For example, FIG. 4 shows various structural configurations for the hollow disc body of an electro-acoustical transducer device 40 utilizing a bowl configuration.

In some arrangements, resonating plates with raised rim portions may be utilized to remove the need for a structurally separated spacer member (e.g., ring spacer 316 as previously depicted).

Similar to previous illustrations, the exemplary resonating plate 412 and the driving member (e.g., piezoelectric member) 414 both comprise substantially annulus planar profiles. In some implementations, an outer diameter of the resonating plate 412 is greater than an outer diameter of the driving member 414. In some implementations, the driving member 414 and the resonating plate 412 are substantially concentrically coupled to each other. In some implementations, a ratio between an inner diameter $D_{in}$ of the resonating plate to the outer diameter $D_{out}$ thereof is in a range of 1:10 to 1:3.

The size of the inner opening diameter $D_{in}$ may be configured to cope with additional axially arranged sound generating components (e.g., the second transducer component 120 shown in FIG. 1). A smaller opening (e.g., a ratio of 1:10) may support better sound output performance in the higher frequency range but may limit the output characteristics of the complementary transducer (e.g., low frequency device). A wider opening may boost lower frequency output at the cost of high frequency range performance. In some implementations, a ratio between an inner diameter $D_{in}$ of the resonating plate to the outer diameter $D_{out}$ thereof is about 1:5. In some applications (e.g., wearable device such as earphones), the outer diameter $D_{out}$ of a resonating plate may be about 10 mm.

In the instant illustration, the resonating plate 412 comprises a substantially flat central well portion 412W, a base portion 412B arranged opposite the central well portion 412W, an annular lip portion 412L that elevates from the well portion 412W along the direction of the axis of propagation A, and a rim portion 412R that surrounds a periphery of the lip portion 412L. In some implementations, the driving member 414 is coupled to the base portion 412B of the resonating plate 412, e.g., upon assembly, the driving member 414 resides outside the chamber of resonance. In some implementations, the rim portion 412R of the resonating plate 412 at least partially forms the peripheral enclosure of the hollow disc body upon assembly. The periphery of the plate members (e.g., resonating plate 412) may be structurally joined by gluing (e.g., epoxy) or welding (e.g., laser welding).

The bottom row of FIG. 4 shows various exemplary implementations of the bowl type resonating plates. From the example on the left, a mirror symmetrical arrangement is adopted, in which two bowl type active sound generation members are coupled to each other at the respective rim portions thereof. In this case, the respective driving members (e.g., piezoelectric layer) of the active sound generation members are disposed outside the chamber of resonance defined between the pair of bowl type resonating plates. The middle arrangement utilizes the combination of a bowl type resonating plate and a flat plate type plate member. For instance, a bowl type active driving member is coupled to a flat type plate member at their respective rim portions, with the driving member arranged outside the chamber of resonance. The example on the right illustrates an asymmetrical setup, in which only one bowl type active sound generation member is utilized in combination with a bowl type resonating plate, thus providing a budget oriented transducer option.

Figure 5:
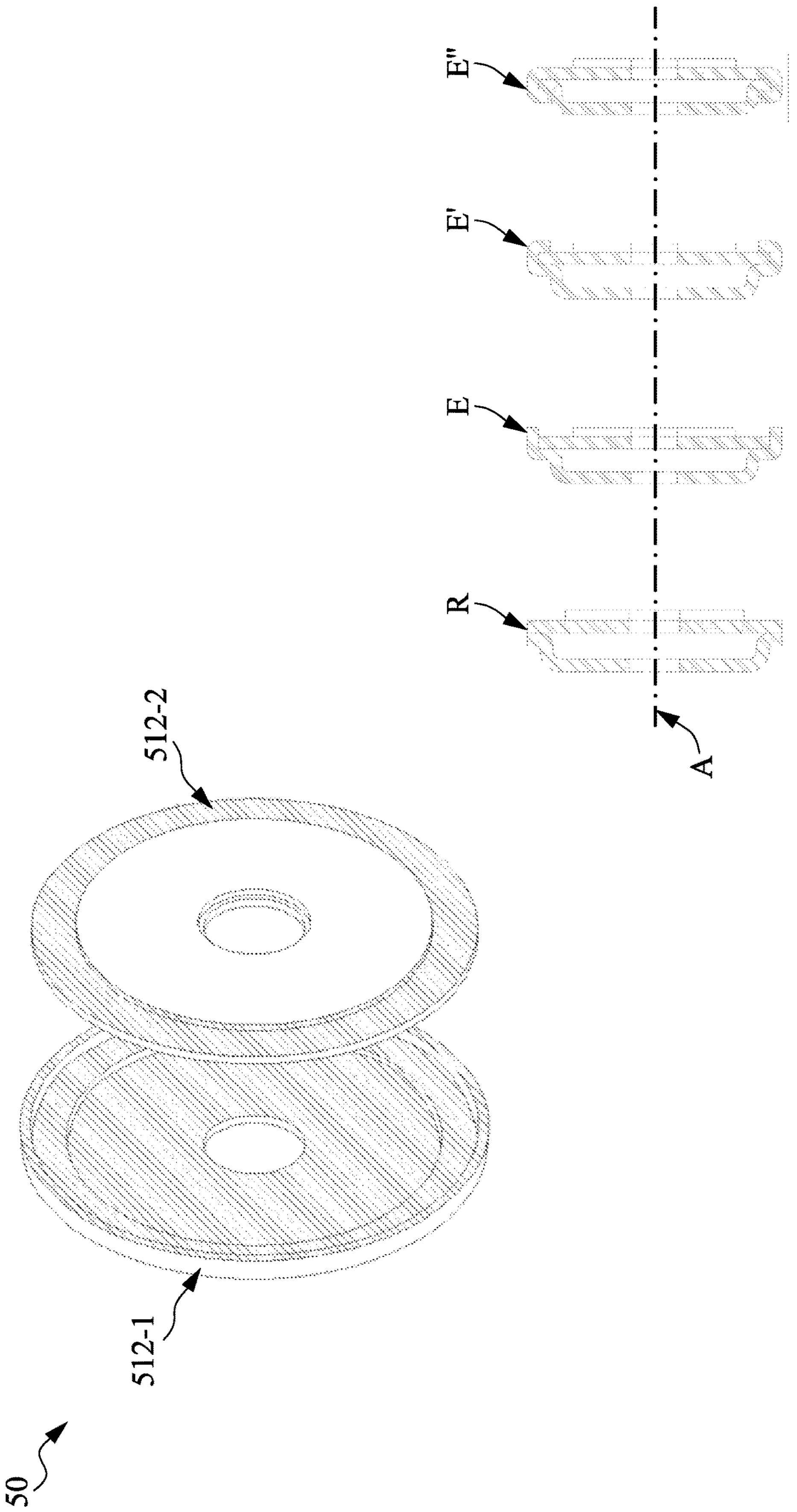
FIG. 5 depicts various assembly configurations of an exemplary transducer component for an electro-acoustical transducer device in accordance with some arrangements of the instant disclosure.

FIG. 5 depicts various assembly configurations of an exemplary transducer component for an electro-acoustical transducer device in accordance with some arrangements of the instant disclosure. For example, FIG. 5 shows various coupling schemes between the components of the hollow disc body of an electro-acoustical transducer device 50.

The hollow disc body of the electro-acoustical transducer device 50 adopts a combination of a bowl type resonance plate member (first transducer component 512-1) and a flat plate type active sound generation member (second transducer component 512-2).

The structural coupling between transducer components 512-1, 512-2 may be achieved using various joining methods. For instance, the left most illustration on the bottom row of FIG. 5 shows structural configuration suitable for welding (e.g., laser welding). In this arrangement, the rim portion of the first transducer component 512-1 may remain flat, and be provided with a same overall diameter as the second transducer component 512-2. Accordingly, a laser welding process may be performed around the edge of the joining interface R of the first and the second transducer components 512-1, 512-2.

In the second illustration, the rim portion of the first transducer component 512-1 is provided with a raised extension E that extends normally from the flat rim portion (along the direction of axis A). In this case, the first transducer component 512-1 would be provided with a slightly greater outer diameter than the second transducer component 512-2. The raised extension E may facilitate alignment and retention of the second transducer component 512-2. Adhesives (e.g., epoxy glue) may then be applied around the edge of the raised extension E to establish structural coupling between the first and the second transducer components 512-1, 512-2.

In the third illustration from the left, the first transducer component 512-1 is provided with a greater outer diameter than the first transducer component 512-2. Moreover, the first transducer component 512-1 is formed with a taller raised extension E' that is long enough to be stamped/pressed against the edge of the second transducer component 512-2 that rests on the rim portion of the first transducer component 512-1, thereby establishing structural coupling between components 512-1, 512-2. In such arrangements, physical joining between the transducer components 512-1, 512-2 may be achieved without application of additional joining agents, such as adhesives.

The right most illustration shows a second transducer component 512-2 having an outer diameter than the first transducer component 512-1. In this example, the second transducer component 512-2 is provided with an extended edge E" having a sufficient width to be stamped/pressed backward against the rim portion of the first transducer component 512-1, thereby achieve structural coupling therebetween.

Figure 6:
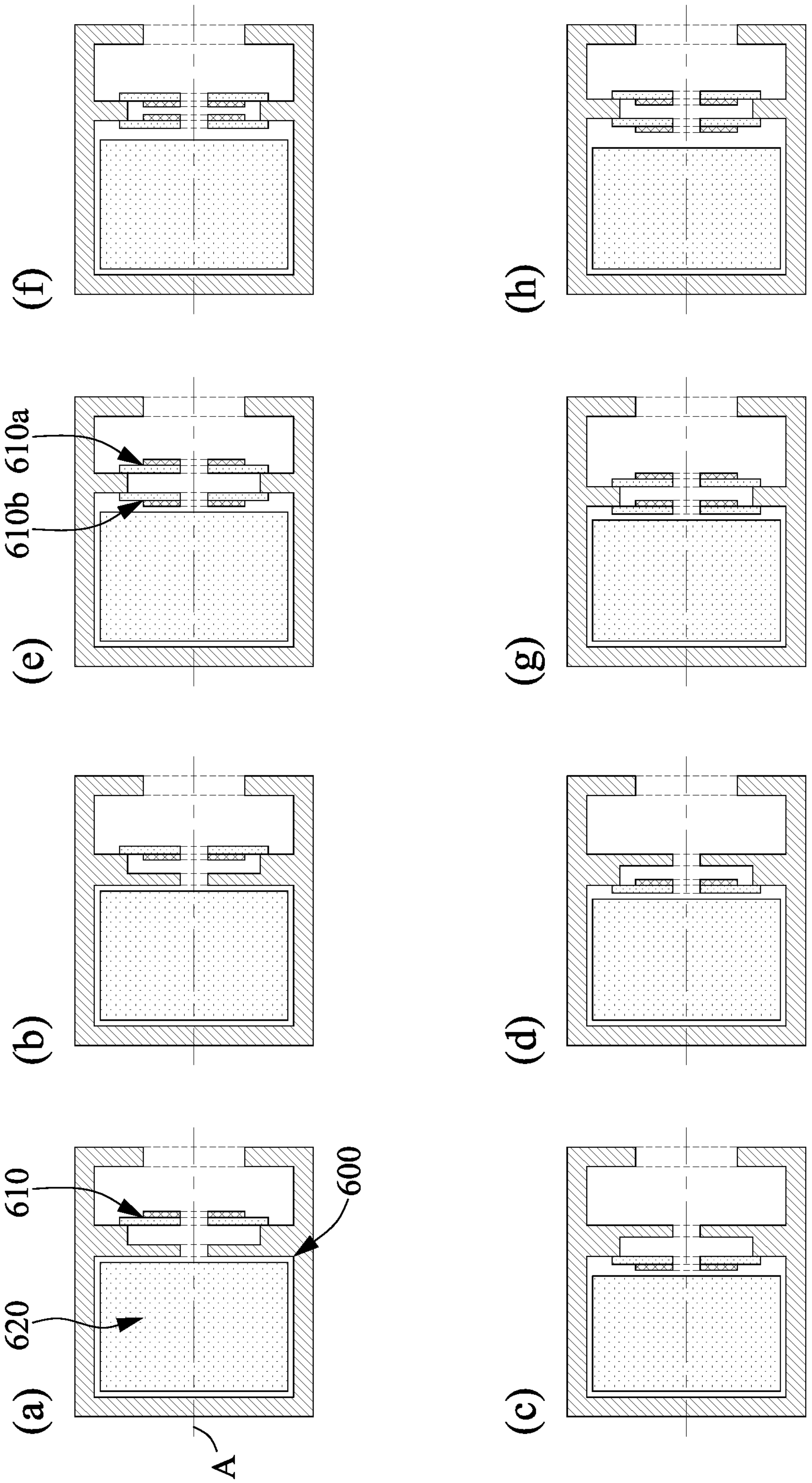
FIG. 6 depicts various multi-transducer integration configurations for an electro-acoustical transducer device in accordance with some arrangements of the instant disclosure.

FIG. 6 depicts various configurations of multi-transducer integration for an electro-acoustical transducer device in accordance with aspects of this disclosure.

In some implementations, only one active sound generation member is used (e.g., single component 610 used in configurations (a), (b), (c), (d) as shown on the left side of FIG. 6). Moreover, in some implementations, one of the pair of plate members that jointly define a chamber of resonance may be integrally formed as a portion of a transducer housing (e.g., housing member 600). For instance, as illustrated in configurations (a)-(d), the housing member 600 is provided with an inner compartment wall, on which a cavity is arranged to define a chamber of resonance. In addition, the reduced wall thickness (e.g., exemplified as a step structure)

toward a central axis of the housing (e.g., axis A) may function as an integrally formed transducer plate member (a first plate member). Accordingly, a second plate member (e.g., the active sound generation member 610) may be disposed on the opposite side of the inner compartment wall (i.e., opposite to the thinner wall region and across the cavity of resonance), thereby forming a first transducer component (e.g., first transducer 110 as shown in FIG. 1) of a multi-transducer device.

In some implementations, a pair of active sound generation members (e.g., members 610*a*, 610*b*) are used for enhanced acoustic output performance (e.g., in configurations (e), (f), (g), (h) as shown on the right side of FIG. 6). In such cases, the pair of active sound generation members 610*a*, 610*b* may be disposed over each side of the inner compartment wall, where a gap is kept there-between to define an empty volume for the chamber of resonance. Accordingly, a first transducer device (e.g., first transducer component 110 as shown in FIG. 1) of a multi-transducer device may be formed.

In the illustrated implementations, the transducer housing (e.g., housing member 600) is further configured to accommodate an additional transducer device. For instance, the additional transducer device may include a different type of acoustic transducer device. For example, the additional transducer device may be a coil type sound generator 620 that excels at a lower frequency spectrum of the acoustic output. In some embodiments, the additional transducer device may be a MEMS type acoustic unit integrated on the active sound generation member (e.g., member 610) in a manner shown in FIG. 11, which will be further depicted in a later section.

An axis of propagation A of the additional transducer device (e.g., component 620) is coaxially arranged along the axis A of the first transducer device (e.g., component 610). The central transmitting port (not specifically labeled in the instant figure) of the first transducer member 610 (which is arranged toward the output opening end of the housing member 600, not specifically labeled) permits the combined acoustic output from both the first and the second transducer components 610, 620.

Figure 7:
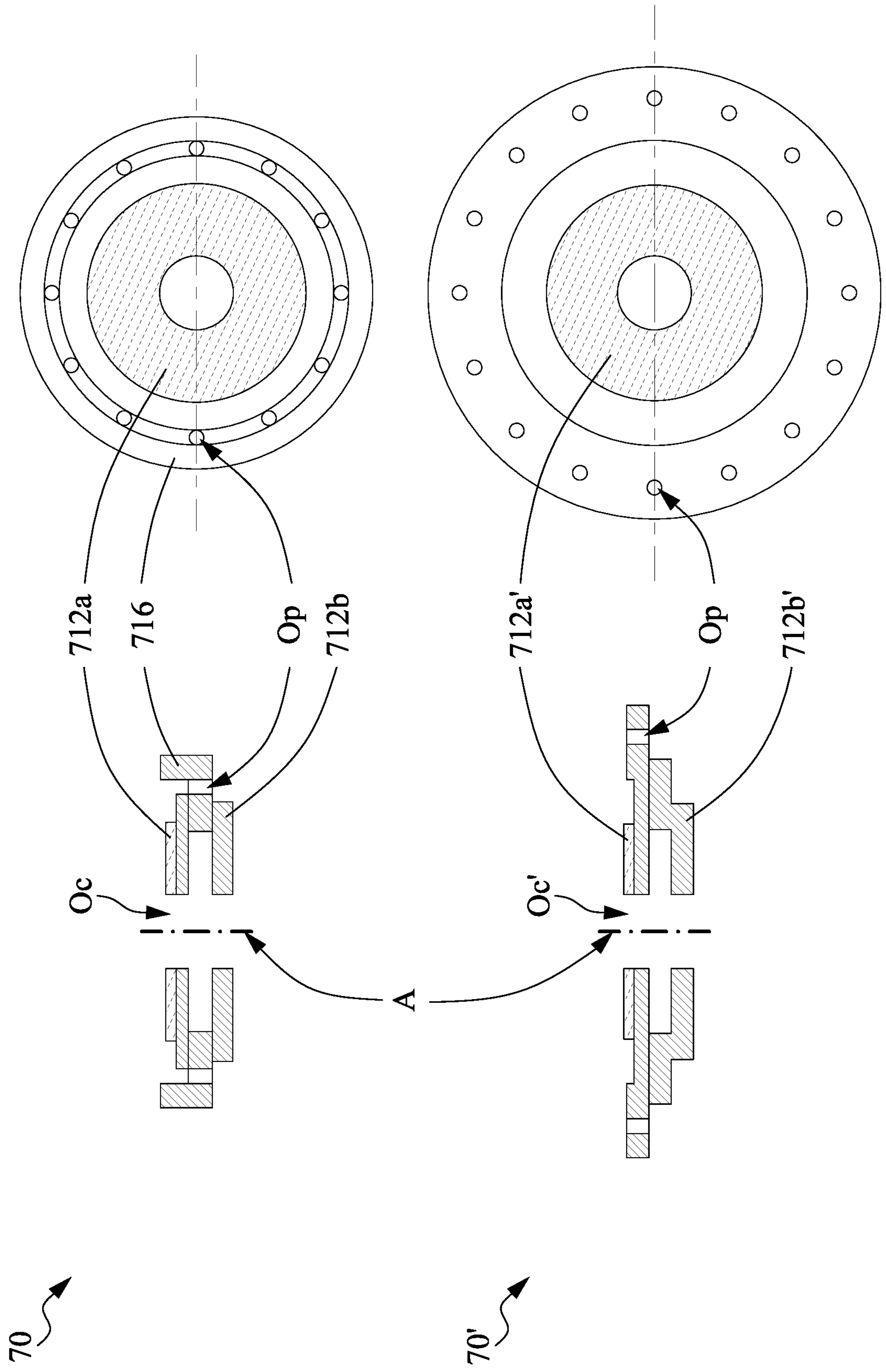
FIG. 7 illustrates planar and sectional views of exemplary transducer components for an electro-acoustical transducer device in accordance with some arrangements of the instant disclosure.

FIG. 7 illustrates planar and sectional views of exemplary transducer components for an electro-acoustical transducer device in accordance with some arrangements of the instant disclosure. For instance, FIG. 7 illustrates exemplary transducer components 70, 70' with additional sound passage arrangements for enhanced acoustic coupling performance, e.g., upon combination with a second transducer component (such as component 620 shown in FIG. 6).

In both illustrated arrangements, peripheral acoustic ports $O_p$ are circumferentially arranged around the periphery (e.g., edge portion) of the exemplary transducer component 700/700'.

In the case of transducer component 700, a spacer configuration is adopted, in which a plurality of peripheral acoustic ports $O_p$ are provided along the circular periphery region of the ring spacer 716 in addition to a central transmitting port $O_c$. A pair of plate members 712*a*, 712*b* sandwich the ring spacer 716 on the respective front and back sides thereof (in a manner similar to that depicted in FIG. 3). Nevertheless, in the present example, the diameter of the ring spacer 716 is substantially greater than those of the plate members 712*a*, 712*b*, such that the additionally provided acoustic ports $O_p$ may be exposed without interference from the plate member 712*a*/712*b* along the axis of propagation A.

In the illustrated example, the acoustic ports $O_p$ are substantially symmetrically placed about the axis of propagation A in a generally equidistance spacing arrangement. It should be noted that other placement patterns may be utilized depending on specific application requirements. In some arrangements, the peripheral acoustic ports $O_p$ have a circular profile and a dimension smaller than that of the central transmitting port $O_c$.

In the case of transducer component 700', a bowl configuration is adopted, in which a plate member 712*a'* with an extended radius is coupled to a bowl member 712*b'* to form a chamber of resonance (in a manner similar to that depicted in FIG. 5). A plurality of peripheral acoustic ports $O_p'$ are provided along the extended periphery region of the plate member 712*a'* in addition to a central transmitting port $O_c'$. In order to avoid interference, placement of the peripheral acoustic ports $O_p'$ are arranged outside the circumference of the bowl member 712*b'*.

In the illustrated example, the acoustic ports $O_p'$ are substantially symmetrically placed about the axis of propagation A in a generally equidistance spacing arrangement. It should be noted that other placement patterns may be utilized depending on specific application requirements. In some arrangements, the peripheral acoustic ports $O_p'$ have a circular profile and a dimension smaller than that of the central transmitting port $O_c'$.

When coupled with a second transducer component (e.g., a coaxially arranged low frequency acoustic unit 620 as shown in FIG. 6), the low range output signals from the second transducer component may be sent through the periphery acoustic ports $O_p/O_p'$ around the high frequency transducer components (e.g., transducer 70/70') to surround the high-frequency signals emitted therefrom, thereby enabling the creation of a distinct sense of acoustic depth and a smooth transition from bass to treble.

Figure 8:
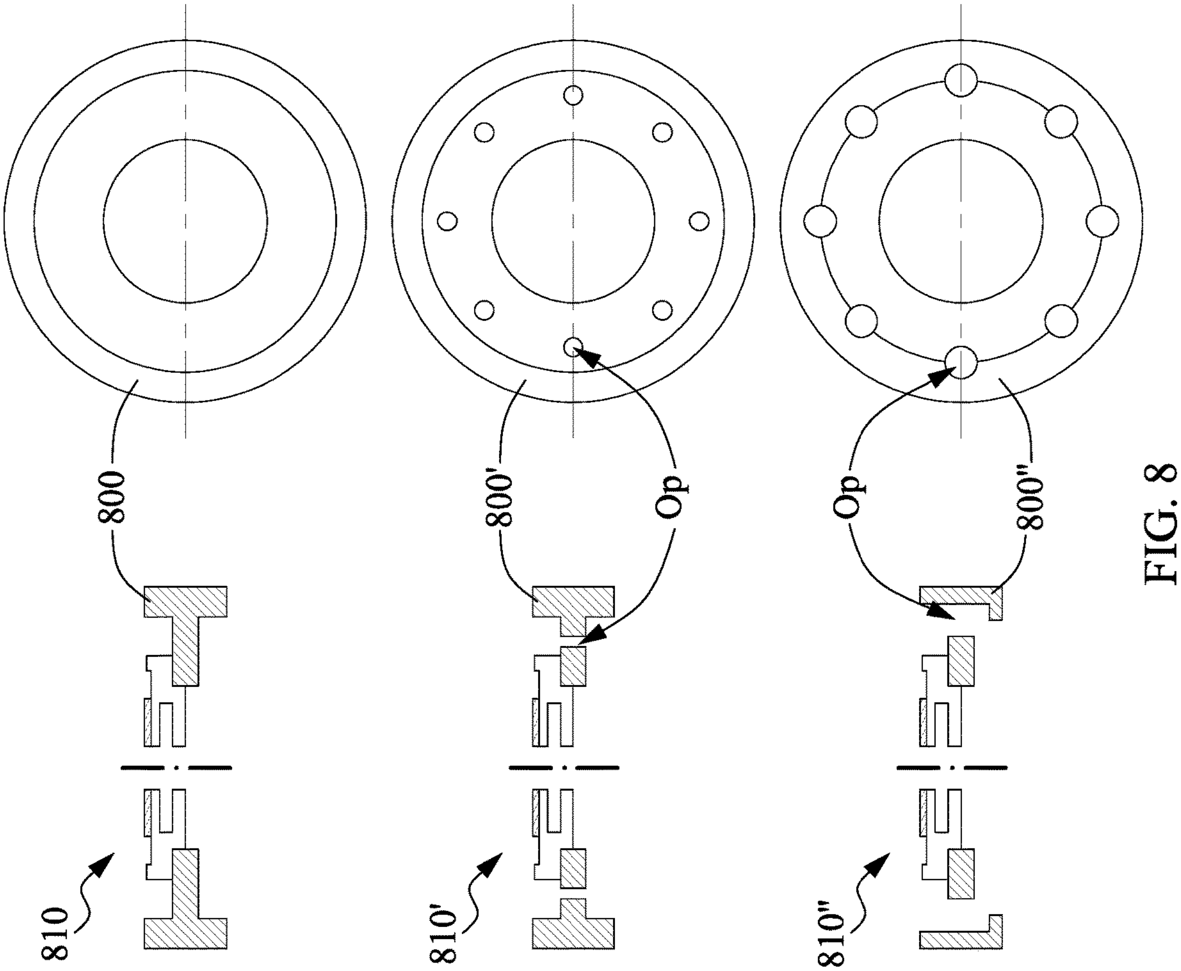
FIG. 8 illustrates planar and sectional views of transducer coupling arrangements for an electro-acoustical transducer device in accordance with some arrangements of the instant disclosure.

FIG. 8 illustrates planar and sectional views of transducer coupling arrangements for an electro-acoustical transducer device in accordance with some arrangements of the instant disclosure. For instance, FIG. 8 shows exemplary arrangements for forming peripheral acoustic ports $O_p$ with external mounting mechanisms (e.g., retaining ring 800/800'/800") outside a piezo-electrical transducer component (e.g., component 810/810'/810") in accordance with the instant disclosure.

For applications with more stringent spatial requirements (e.g., earbud/insertion type earphones), a smaller mounting brace (e.g. brace member 800/800'/800") having a dimension suitable for fitting into the auditory canal of a user may be utilized. For instance, a circular ring type mounting bracket 800 with suitably small diameter may be provided to house a miniaturized piezo-electrical transducer (e.g., component 810) in accordance with the instant disclosure. The piezo-electrical transducer 810 may be comparable in structural design to those described in previous examples (e.g., FIGS. 2-5). On the other hand, the mounting bracket 800 may be a stand-along component, or an integrated structure of a housing member (such as an inner compartment wall of the housing member 600 as shown in FIG. 6.

The center hollow region of the retaining ring 800 may be sized slightly smaller than a diameter of the piezo-electrical transducer 810, so as to create a mechanical interface for retention. In some arrangements, the piezo-electrical transducer 810 may comprise a bowl type configuration, where the step-like bottom contour of the base portion of the bowl structure are configured to fit into the center hollow region of the retaining ring 800, thereby establishing an enlarged coupling interface.

Aside from the center hollow region, additional periphery acoustic ports (e.g., ports $O_p$) may be integrated on the retaining ring. For instance, a plurality of peripheral acoustic ports $O_p$ are provided within the thicker rim portion of the retaining ring 800'. In the instant example, the placement of the periphery acoustic ports $O_p$ are maintained projectively outside the circumference of the piezo-electrical transducer 810' to prevent interference of the low frequency signal output (e.g., from a second transducer unit, such as component 620 shown in FIG. 6).

Likewise, a plurality of periphery acoustic ports $O_p$ are arranged circumferentially along the periphery region of the exemplary retaining ring 800", but placed further outward and partially through the thicker rim portion thereof. It is noted that the specific number, shape, and location of the periphery acoustic ports depends on the practical application requirements, and should not be limited to the exemplary configurations illustrated in the instant figure.

Figure 9:
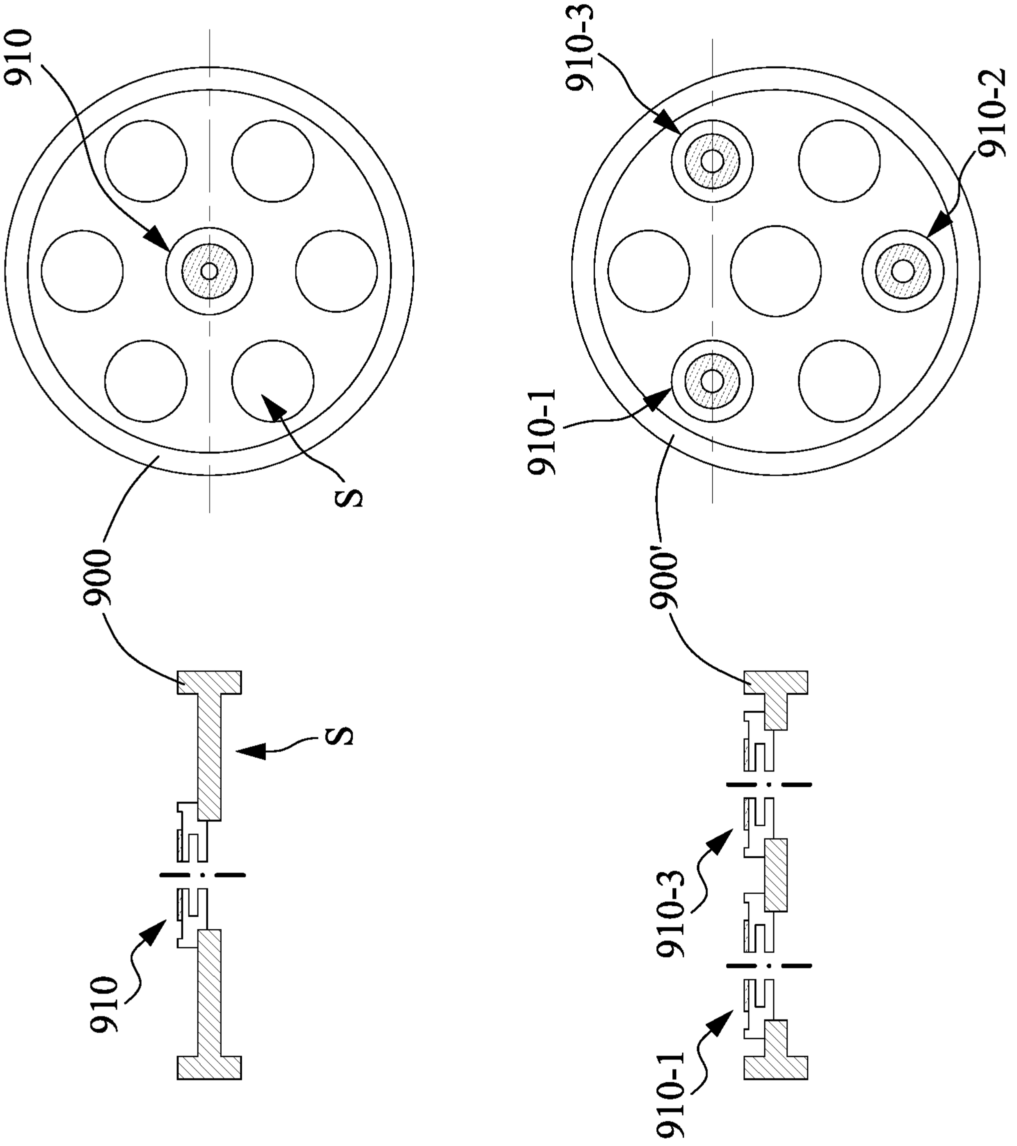
FIG. 9 illustrates planar and sectional views of transducer coupling arrangements for an electro-acoustical transducer device in accordance with some arrangements of the instant disclosure.

FIG. 9 illustrates planar and sectional views of transducer coupling arrangements for an electro-acoustical transducer device in accordance with some arrangements of the instant disclosure. For instance, FIG. 9 shows exemplary mounting mechanisms (e.g., retaining member 900/900') for simultaneously accommodating one or more piezo-electrical transducer components (e.g., components 910/910-1/910-2/910-3) in accordance with the instant disclosure.

For applications of larger dimension and/or higher output requirement (e.g., wearables such as over ear headphones, or even stationary devices such as loudspeaker units), a larger mounting brace (e.g. brace member 900/900') having multiple mounting slots may be utilized. For instance, a circular disc type mounting bracket 900 with a plurality of retaining slots S may be provided to house one or more miniaturized piezo-electrical transducer (e.g., components 910, 910-1, 910-2, 910-3) in accordance with the instant disclosure. The piezo-electrical transducer 910 may be comparable in structural design to those described in previous examples (e.g., FIGS. 2-5). On the other hand, the mounting bracket 900 may be a stand-along component, or an integrated structure of a housing member (such as an inner compartment wall of the housing member 600 as shown in FIG. 6.

Thanks to the small form factor nature of the piezo-electrical transducers 910, 910-1, 910-2, 910-3, the incorporation of multiple retaining slots S in the brace member 900/900' may enable flexible quantity and/or placement selections of the transducer units, thereby meeting a wide range of application requirements. For instance, a single, centrally placed transducer unit 910 on the brace member 900 provides a budget conscious setup for a larger dimension application. In contrast, for a larger application that calls for higher output capabilities, the multi-transducer configuration (e.g., transducer units 910-1, 910-2, and 910-3) may be adopted on the brace member 900' to meet the higher performance requirement with minimum hardware alternation.

Figure 10:
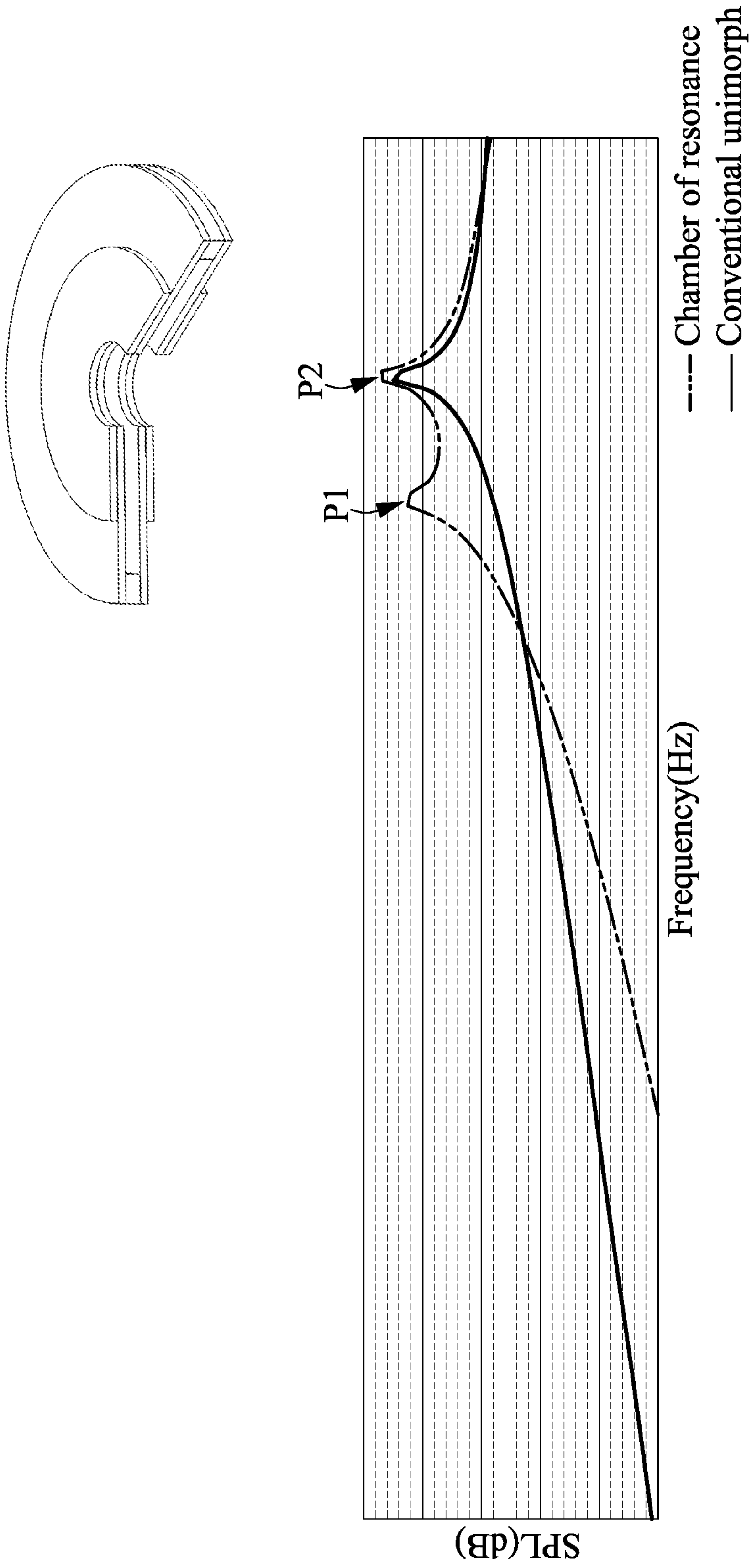
FIG. 10 depicts an output vs. frequency plot that reflects performance enhancement of a transducer component in accordance with aspects of this application.

FIG. 10 depicts an exemplary output vs. frequency plot that reflects performance enhancement of a transducer component in accordance with aspects of this disclosure. Particularly, the chamber of resonance formed in the hollow body of the disclosed acoustic transducer component (e.g., device 20 as shown in FIG. 2) enables the generation of twin peaks (i.e., a peak of air resonance in addition to a peak of structural resonance) in the output sound pressure level (SPL) along an output frequency band of the electro-acoustical transducer device.

Compared with a conventional single unimorph design (whose output plot being shown by the solid line), the additionally gained region between the twin peaks translates to an extended output frequency range at a higher pressure level, which may substantially boost the transducer performance at minimal increase of component dimension. For instance, the piezoelectric unit (e.g., device 20) is driven by an input electrical signal due to the inverse piezoelectric effect to generate sound.

Using again the transducer device 20 illustrated in FIG. 2 as example, the chamber of resonance formed by separating a pair of plate members 212-1, 212-2 (e.g., through an ring spacer such as spacer 216, or by an annular groove in a bowl type configuration as shown in FIG. 4, or by a housing compartment structure as shown in FIG. 6) facilitates additional resonance through the squeezing of air in the chamber, so as to gain a SPL raise in an extended frequency band. Accordingly, sound pressure level increase in a continuous bandwidth range may be obtained in the overall frequency response. In some implementations, an optimized frequency bandwidth is a range of about 1 kHz to 40 kHz.

Figure 11:
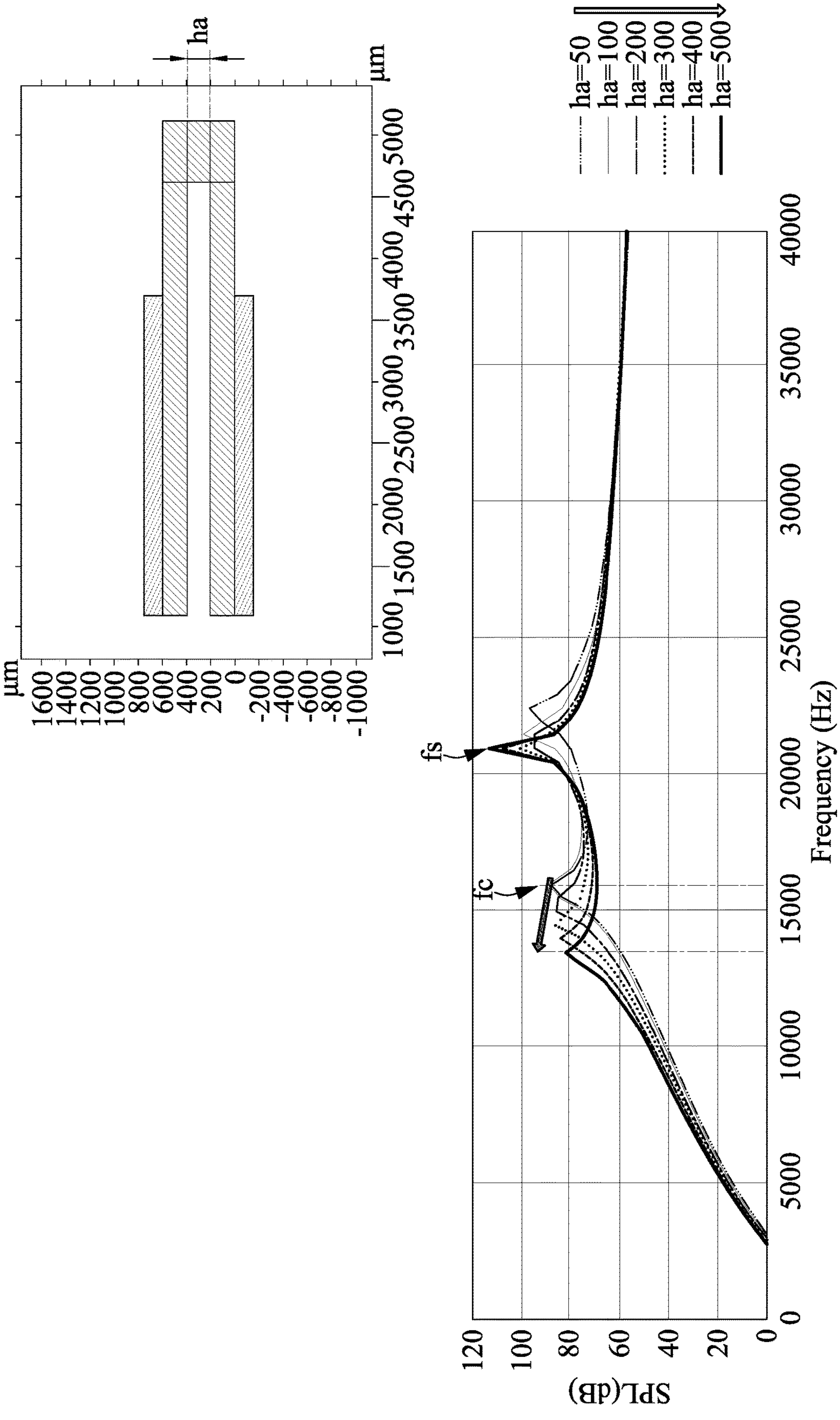
FIG. 11 shows an output vs. frequency plot corresponding to various configurations for the pair of plate members that define the height (ha) of the chamber of resonance.

FIG. 11 shows an output vs. frequency plot corresponding to various separation configurations for the pair of the plate members that define the height ($h_a$) of the chamber of resonance.

In some embodiments, the separation distance ha between the pair of plate members (e.g., members 212-1, 212-2) substantially corresponds to the thickness of the ring spacer (e.g., spacer 216). As shown in FIG. 8, the frequencies at the first peak region fs correspond to a resonance frequency of the hardware structure of the transducer device. On the other hand, the frequencies at the second peak region $f_c$ corresponds to a resonance frequency of the chamber of resonance provided between the resonating plate members. The separation distance ha between the resonating plate members may be tuned to adjust the frequency of the second peak. For instance, an increase of the separation ha between the plate members may correspond to a second peak at a lower frequency. In some embodiments, an outer diameter of the resonating plate is in an order of 1 centimeter. Through the inventors' extensive efforts of exploration, a ratio between the chamber height ($h_a$) and an outer diameter ($D_{out}$) of a resonating plate member may be in a range of 1% to 5%.

Figure 12:
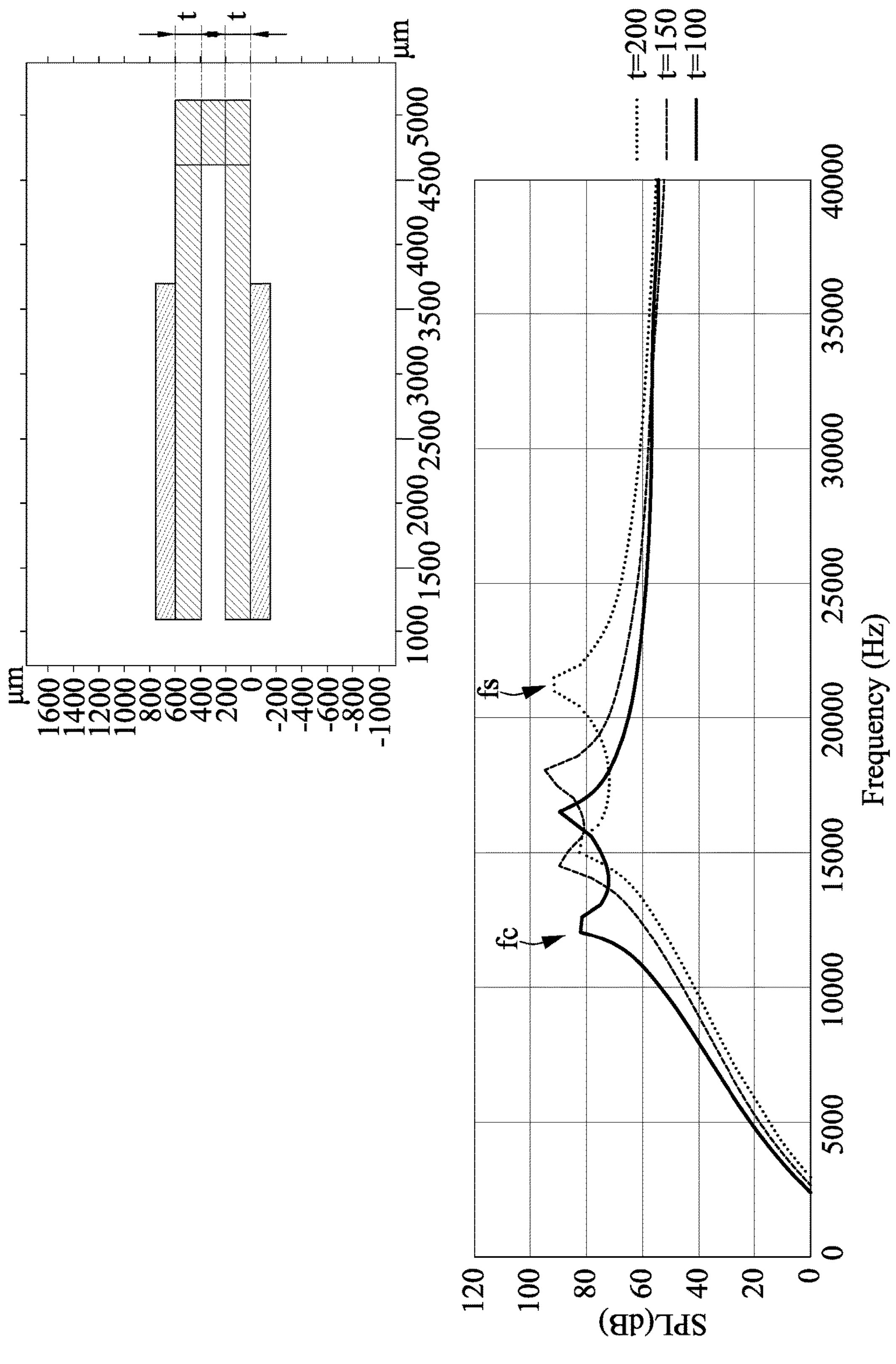
FIG. 12 shows an output vs. frequency plot corresponding to various plate thickness (t) configurations for the pair of the plate members that define the chamber of resonance.

FIG. 12 shows an output vs. frequency plot corresponding to various thicknesses of plate members. For instance, FIG. 9 shows an output vs. frequency plot corresponding to various plate thickness configurations for the pair of the plate members (e.g., members 212-1, 212-2) that define a height of a chamber of resonance.

As shown in the upper right corner of FIG. 12, the each of the resonating plates comprises a thickness (t). Similar to that shown in FIG. 11, the frequencies at the first peak region (the higher frequency peak) correspond to a resonance frequency of the hardware structure of the transducer device. On the other hand, the frequencies at the second peak region (the lower frequency peak) corresponds to a resonance frequency of the chamber of resonance provided between the resonating plate members. The thickness adjustment of the resonating plate members will concurrently affect the frequency of the first peak (i.e., the peak of structural resonance) and the second peak (i.e., the peak of chamber resonance). For instance, a reduction of plate member thickness would simultaneously move the first and the second peaks toward a lower frequency range.

The thickness optimization of the resonating plate requires the consideration of several important factors, including those pertains to the feasibility of mass-production. Through the inventors' extensive efforts of exploration, a ratio between the thickness (t) and the outer diameter of the resonating plate ($D_{out}$) may be in a range of about 0.5% to 5%. In some embodiments, a thickness of the hollow body of an electro-acoustical transducer component in accordance with aspects of the instant disclosure is only about 2 to 3 times that of a conventional single unimorph design.

Figure 13:
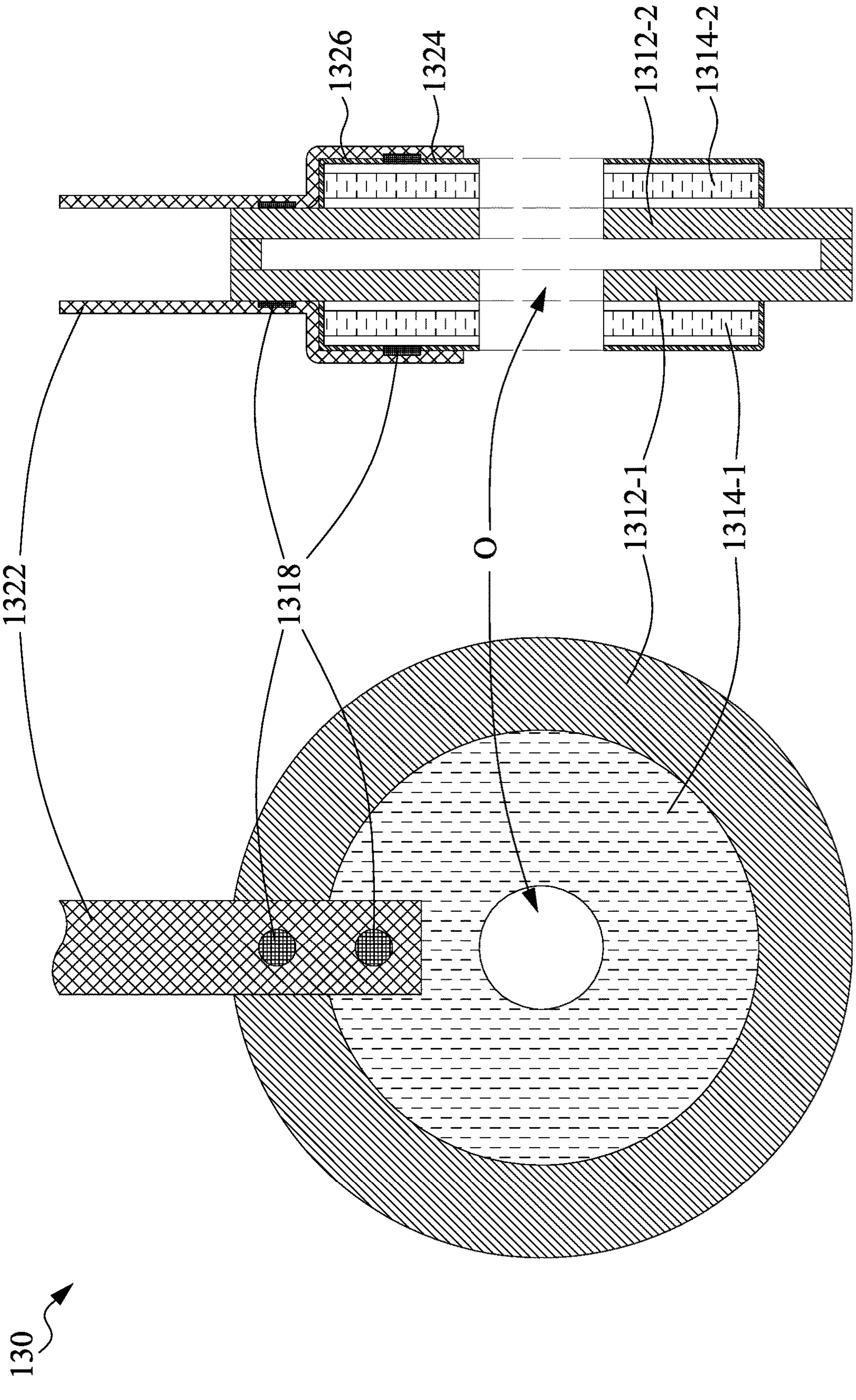
FIG. 13 illustrates exemplary structural arrangements of a transducer component for an electro-acoustical transducer device in accordance with aspects of this disclosure.

FIG. 13 illustrates exemplary electrode arrangement of a transducer component for an electro-acoustical transducer device in accordance with aspects of this disclosure. For instance, FIG. 13 shows a planar and a corresponding cross-sectional view of an exemplary transducer device 130.

The exemplary electro-acoustical transducer device 130 comprise a circular hollow disc body with a hole formed at the center region thereof. The hollow disc body of the illustrated transducer device 130 comprises a pair of plate members 1312-1, 1312-2 arranged parallel to and kept at a separation with each other (e.g., by a ring spacer, not specifically labeled), thereby defining a chamber of resonance there-between. Each of the plate members 1312-1, 1312-2 is provided with a central transmitting port O. Accordingly, a ring-opening that enables access to the chamber of resonance is formed between the central transmitting ports O of the plate members 1312-1, 1312-2.

In the illustrated implementations, both the plate members 1312-1, 1312-2 comprise active sound generation members. For instance, each of the plate members 1312-1, 1312-2 has a driving member (e.g., piezoelectric layer) 1314-1/1314-2 attached thereto (arranged outside the chamber of resonance). One or more conductive routing(s) 1322 that traverses over both the driving member 1314 and the plate member 1312 are provided to transmit electrical signal to the transducer components. The conductive routing 1322 may comprise a planar signal conducting structure that favors the reduction of form factors and device reliability. For example, the conductive routing 1322 may comprise a conductive routing pattern disposed by suitable methods such as electroplating or physical vapor deposition (PVD) techniques, or integrated on a flexible printed circuit (FPC) member.

In the instant illustration, electrical contacts 1318 are arranged between the conductive routing 1322 and the transducer components 1312, 1314 to enable signal connection. A conductive layer (e.g., layer 1324) is disposed over a planar surface of the driving member 1314-1/1314-2. A protective layer (e.g., passivation layer 1326) may be further formed over the conductive layer 1324.

Figure 14:
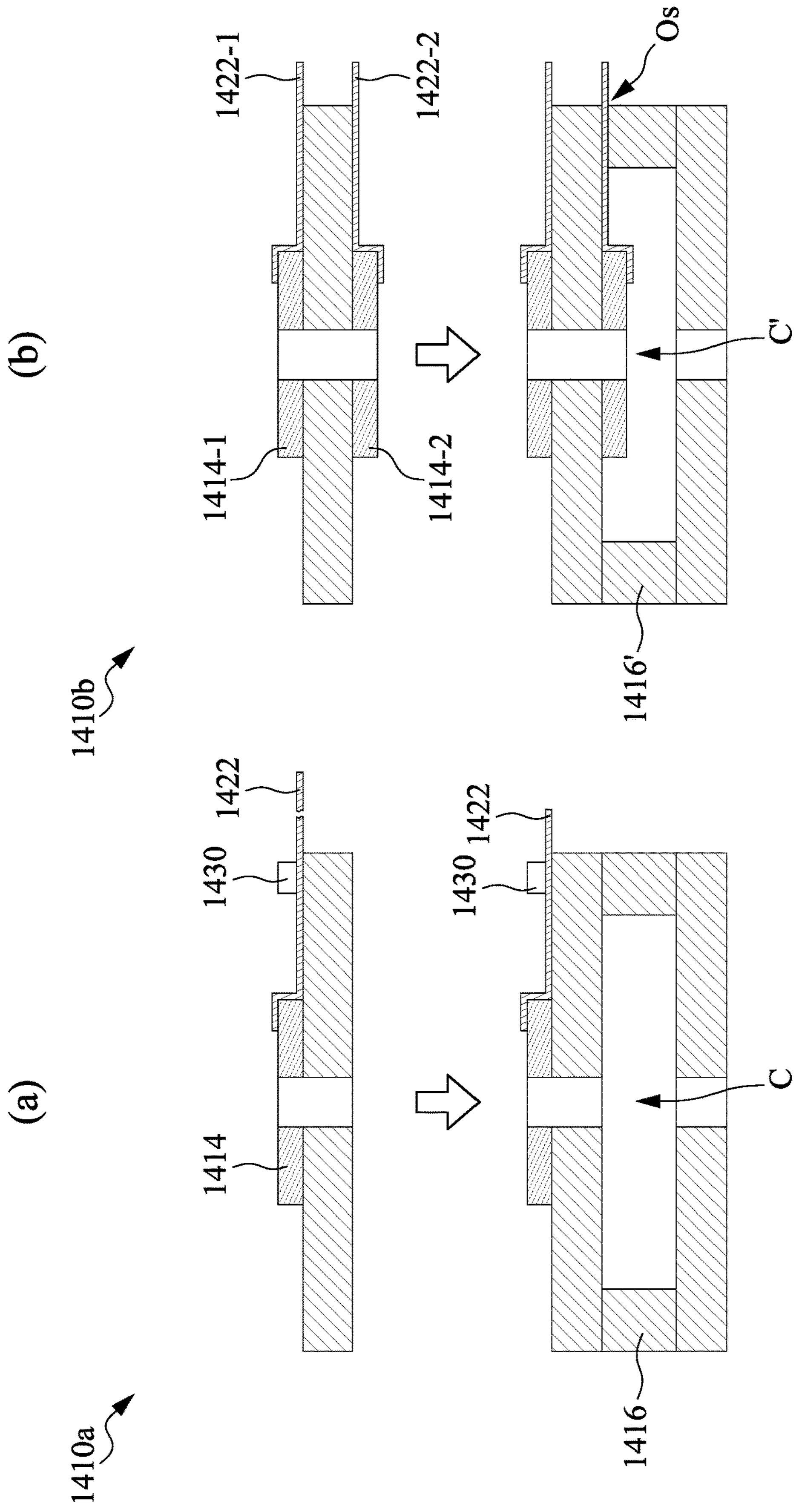
FIG. 14 illustrates exemplary structural arrangements of a transducer component for an electro-acoustical transducer device in accordance with aspects of this disclosure.

FIG. 14 illustrates exemplary structural arrangements of a transducer component for an electro-acoustical transducer device in accordance with aspects of this disclosure. For instance, FIG. 14 schematically shows signal routing arrangements for different transducer configurations (a) and (b) in accordance with the instant disclosure.

Configuration (a) illustrates a unimorph setup, in which a flat plate type unimorph 1410*a* having a single driving layer (e.g., piezoelectric layer 1414) is used. A signal routing structure 1422 is provided over the top (exposed) surface of the unimorph 1410*a* to enable signal transmission to the piezoelectric layer 1414. The signal routing structure 1422 may comprise a flexible printed circuit unit that is thin and pliable. In some implementations, one or more discrete circuit element(s) such as capacitor(s) and/or resistor(s) may be disposed on the signal routing structure 1422. For instance, in the illustrated configuration (a), a resistor 1430 of a piezo audio amplifier circuit is integrated on the signal routing structure 1422. The integrated passive component (e.g., resistor 1430) on the signal routing structure 1422 may help to improve the stability of a preamp power supply and reduce the heat generation of a preamp IC.

Upon coupling of the unimorph 1410*a* with a ring spacer 1416 and a second plate member (not specifically labeled), a transducer component having an embedded chamber of resonance C in accordance with the instant disclosure is formed. In the illustrated example, the passive circuit element (e.g., resistor 1430) is arranged over the anchored end of the signal routing structure 1422 over the ring spacer 1416. The signal routing structure 1422 may further extend away from the unimorph 1410*a* to connect other circuit components of the transducer device (not specifically shown).

Configuration (b) illustrates a bimorph setup, in which a flat plate type bimorph 1410*b* having a pair of opposing driving layers (e.g., piezoelectric layers 1414-1, 1414-2) is used. A pair of opposing signal routing structures 1422-1, 1422-2 are arranged over both the top (exposed) and bottom (enclosed) sides of the bimorph 1410*b* to enable signal transmission to the piezoelectric layers 1414-1, 1414-2. The signal routing structures 1422-1/1422-2 may be comparable to that depicted in the previous example. In some implementations, a side opening $O_s$ may be provided at a selected location of the ring spacer 1416' to enable lateral passage of the signal routing structure 1422-2 from the chamber of resonance C'.

Figure 15:
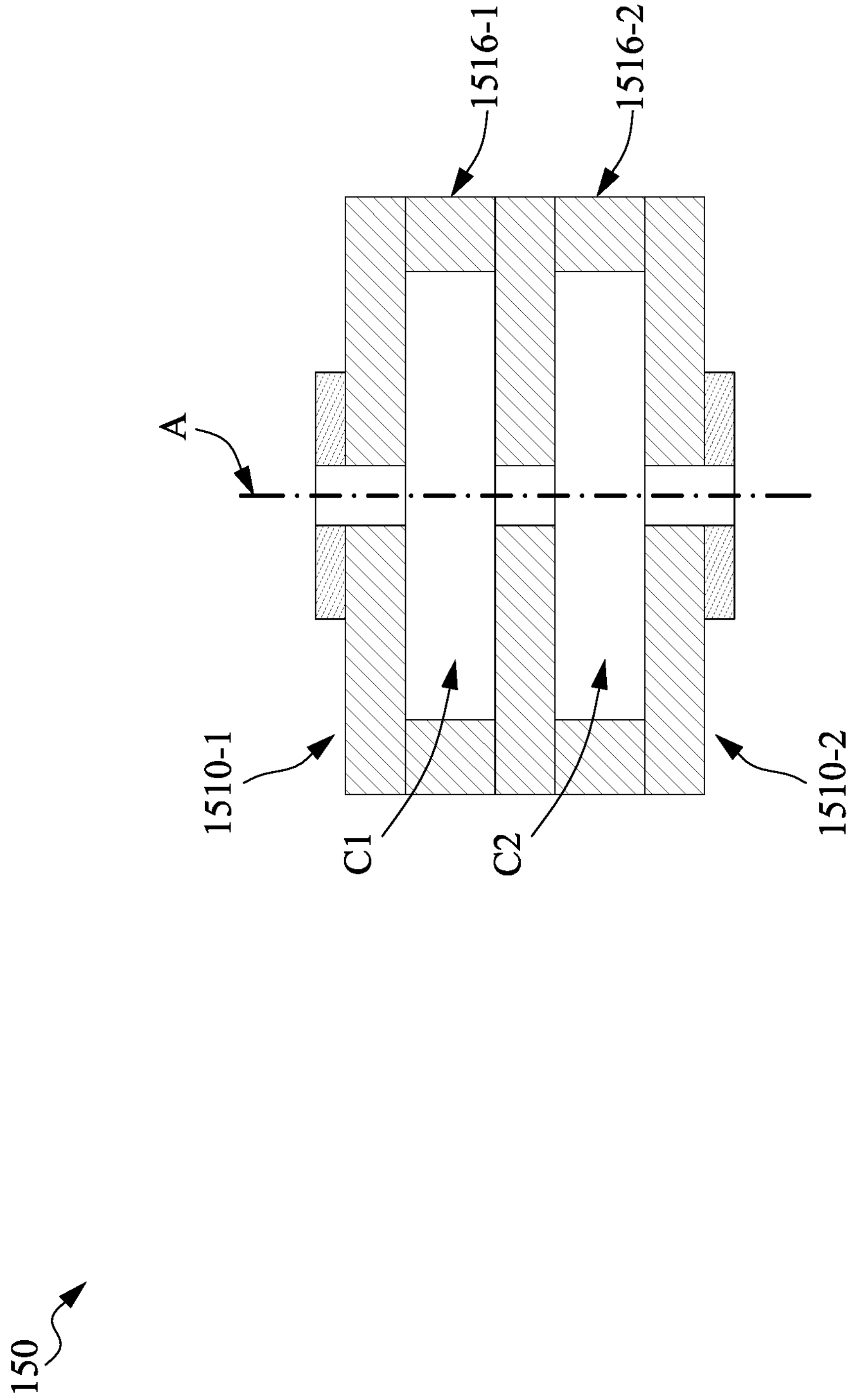
FIG. 15 illustrates an exemplary structural arrangement of a transducer component for an electro-acoustical transducer device in accordance with aspects of this disclosure.

FIG. 15 illustrates an exemplary structural arrangement of a transducer component for an electro-acoustical transducer device in accordance with aspects of this disclosure. For instance, FIG. 15 schematically shows an exemplary multi-chamber arrangement for a transducer component 150 in accordance with some implementations of the instant disclosure.

Configuration (a) schematically shows an exemplary transducer component 1510-1 that incorporates a double deck, twin chamber layout, which may enable further tuning to extend the output bandwidth of a transducer device. By way of example, a pair of active sound generation members 1510-1, 1510-2 are coupled together by a pair of ring spacers 1516-1, 1516-2 and a middle plate member (not specifically labeled), thereby forming a transducer component with a pair of stacked, coaxially arranged chambers of resonance C1, C2 along the axis of propagation A.

The sequentially coupled chambers of resonance C1, C2 along the axis of propagation A may enable an extended level of tuning. For instance, by adjusting the thickness of the ring spacer 1516-1/1516-2 and/or the thickness of the active sound generation member 1510-1/1510-2, the output bandwidth and characteristics of the transducer component may be further optimized. In some implementations, active sound generation members having resonating plates of different materials may be used to further extend tunability of the transducer device.

Figure 16:
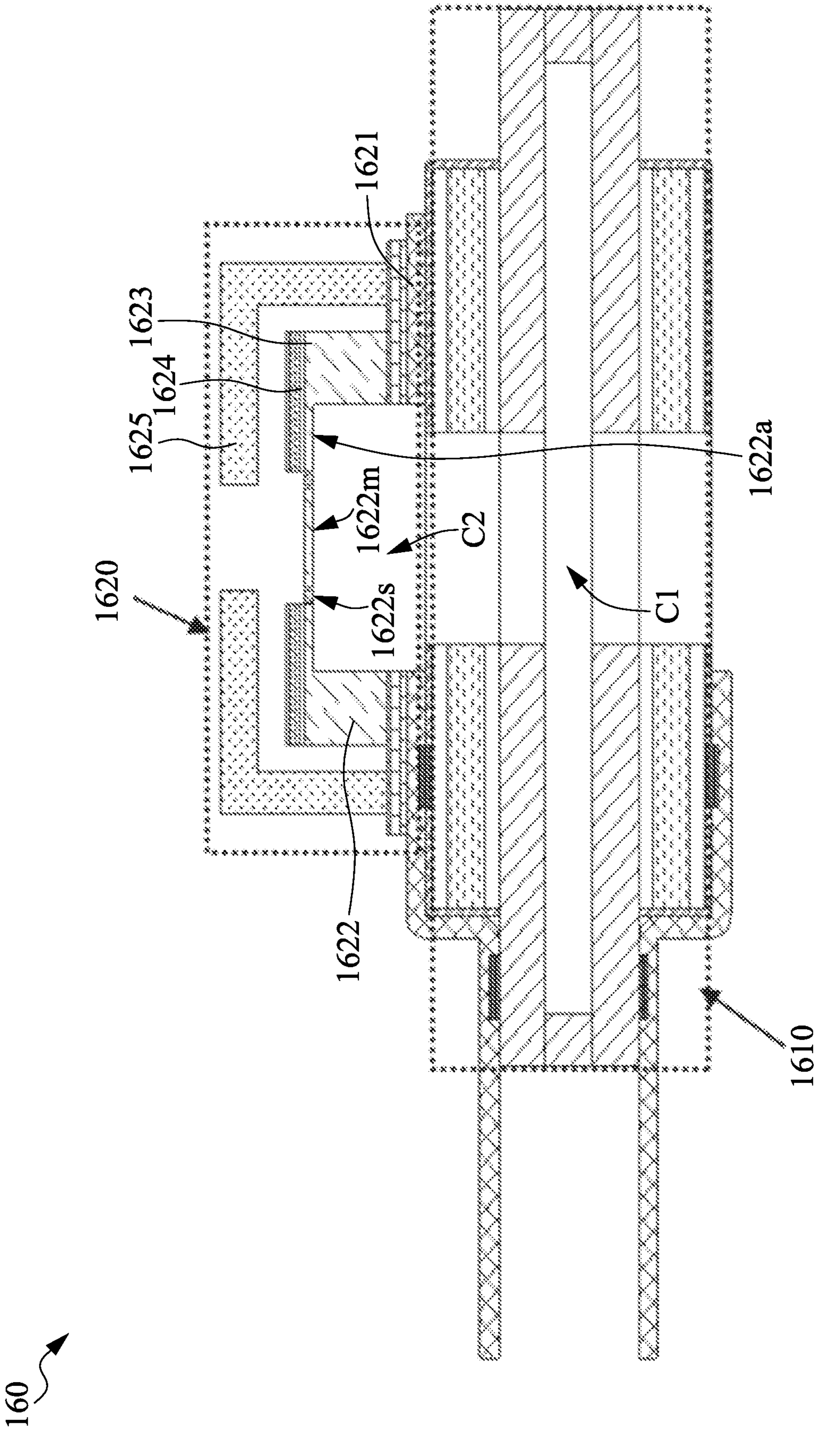
FIG. 16 illustrates a cross-sectional view of a composite-type acoustic transducer component for an electro-acoustical transducer device in accordance with aspects of this disclosure.

FIG. 16 illustrates a cross-sectional view of a composite-type acoustic transducer component for an electro-acoustical transducer device in accordance with some aspects of this disclosure. For instance, FIG. 11 shows a composite-type acoustic transducer component 160 that utilizes the vertical integration of an active (piezoelectric) transducer unit 1610 and a passive (MEMS) amplifying unit 1620 in a coaxial configuration.

The active transducer unit 1610 (e.g., the first transducer component) may comprise the hollow disc transducer member as previously depicted. For instance, the active transducer device 1610 may comprise a circular hollow disc body with a hole formed at the center region thereof. The hollow disc body of the illustrated transducer device 1610 comprises a pair of plate members (not specifically labeled) arranged parallel to and kept at a separation with each other by a ring spacer (not specifically labeled), thereby defining a chamber of resonance C1. Each of the plate members is provided with a central transmitting port. Accordingly, a ring-opening that enables access to the chamber of resonance C1 is formed between the central transmitting ports of the plate members. Moreover, the central region of the active transducer unit 1610 is suspended and free from physical hindrance (e.g., structural connection/attachment to other device components).

In addition, both the plate members of the active transducer unit 1610 are active sound generation members having a respective driving member attached thereto (arranged outside the chamber of resonance, not specifically labeled). A pair of conductive routings are provided to transmit electrical signal to the transducer components. Moreover, electrical contacts are arranged between the conductive routing and the transducer components to enable signal connection.

The passive amplifying unit 1620 (e.g., the second transducer component) may comprise a MEMS structure compatible with micro-processing technology of the semiconductor fabrication process. The passive amplifying unit 1620 may possess a second axis of propagation, which is arranged in substantial alignment with the axis of propagation of the active transducer unit 1610. In the illustrated example, the passive amplifying unit 1620 is arranged on one of the resonating plates of the active transducer unit 1610 to facilitate further acoustic excitation, thereby boosting the output performance of the device. The passive amplifying unit 1620 comprises base portion 1621 that interfaces with the active transducer unit 1610. In some implementations, the base portion 1621 may comprise a circuit board layer.

A semiconductor layer (e.g., layer 1622) is further provided on the base portion 1621 and arranged projectively over the central transmitting port of the active transducer unit 1610. The semiconductor layer may comprise an driving portion 1622*a* that is anchored on the base portion 1621, a spring portion 1622*s* that extend from the driving portion 1622*a*, and a resonating membrane portion 1622*m* suspended by the spring portion 1622*s* over (and in alignment with) the central transmitting port. In some implementations, the semiconductor layer may be fabricated from a silicon substrate. With the cantilever configuration of the semiconductor layer 1622, an additional chamber of resonance C2 may be defined between the passive amplifying unit 1620 and the active transducer unit 1610.

A driving member 1623 is arranged over the driving portion 1622*a* of the semiconductor layer, configured to exert a driving force upon receipt of an electric signal (e.g., voltage) to cause vibration of the resonating membrane portion 1622*m* through the spring portion 1622*s*. In some implementations, the driving member 1623 comprises a MEMS actuator comparable to the piezoelectric layer as previously depicted. A conductive layer (e.g., electrode layer) 1624 is further disposed over the driving member 1623.

In the illustrated arrangement, the driving member 1623 (and the conductive layer 1624) laterally extends just shy of the spring portion 1622*s* of the semiconductor layer. That is, the spring portion 1622*s* and the resonating membrane portion 1622*m* are substantially free of additional material coverage. Accordingly, the resonating membrane portion 1622*m* and the spring portion 1622*s* may possess a lower thickness than the cantilevering driving portion 1622*a* of the semiconductor layer. Such arrangement may ensure better freedom of vibration for the resonating membrane portion 1622*m*, which further enhances acoustic performance of the device.

A package cover 1625 is further disposed over the base portion 1621 to provide shielding of the delicate transducer components underneath. The package cover 1625 is also configured with a central opening in alignment with the resonating membrane portion 1622*m*/central transmitting port of the composite-type acoustic transducer component.

Figure 17:
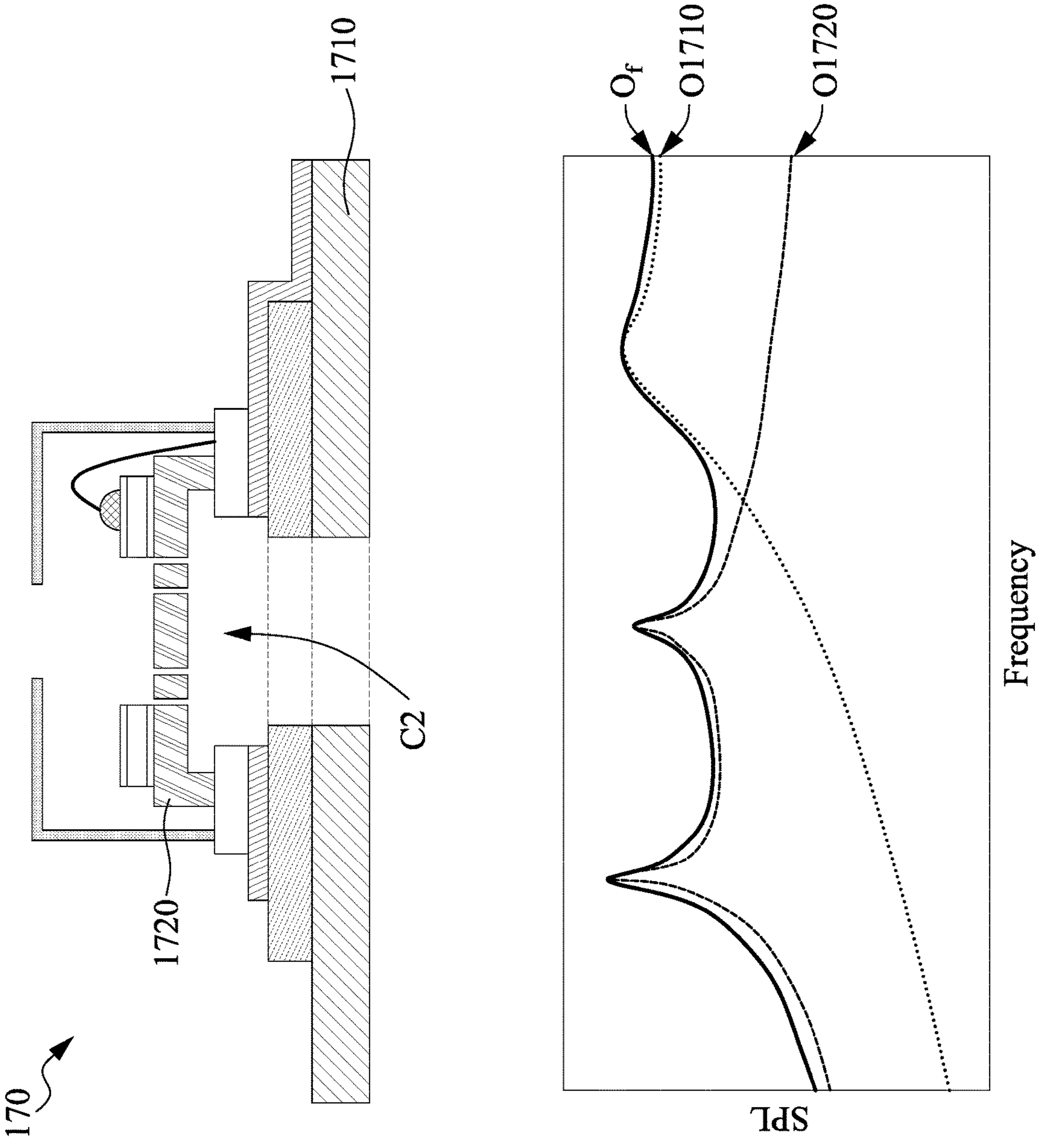
FIG. 17 illustrates a schematic output vs. frequency diagram showing enhanced output performance from components of a composite-type acoustic transducer component for an electro-acoustical transducer device in accordance with aspects of this disclosure.

FIG. 17 illustrates a schematic output vs. frequency diagram showing enhanced output performance from components of a composite-type acoustic transducer component for an electro-acoustical transducer device in accordance with aspects of this disclosure.

For instance, FIG. 17 shows schematic output vs. frequency diagram of a composite-type acoustic transducer component 170 that comprises vertically integrated active transducer unit (e.g., an active sound generation plate member 1710) configured to provide base excitation, and a passive amplifying unit (MEMS amplifier 1720) configured to generate enhanced sound pressure. In some implementations, the active transducer unit may utilize the hollow disc transducer member (e.g., ceramic/piezoelectric type transducers) as previously depicted. In some implementations, the passive component may be a MEMS structure compatible with micro-processing technology of the semiconductor fabrication process.

Similar to the previous example, the active transducer unit 1710 and the passive amplifying unit 1720 are arranged in a coaxial configuration. In addition, a chamber of resonance C2 is formed between the active transducer unit 1710 and the passive amplifying unit 1720. The vertical integration of the active unit and the passive unit further warrants the formation of the chamber of resonance C2, which is configured to induce enhanced resonating effect similar to the dual-plate transducer structure depicted in previous embodiments. Meanwhile, the lower resonant frequency of a MEMS transducer and the higher resonant frequency of a ceramic/piezoelectric transducer may be expected to generate an effect of superimposing sound pressure, so as to meet the operational requirements of large frequency bandwidth. For instance, the passive amplifying unit 1720, upon powering, generates a basic sound pressure; sound pressure of additional frequencies can be increased due to the active transducer unit 1710 being further excited by the passive amplifying unit 1720 (e.g., as illustrated by the combined output $O_f$ from output $O_{1719}$ and output $O_{1729}$), thereby increasing the continuous bandwidth of high sound pressure in the overall frequency response.

Moreover, through micro-fabrication technology of semiconductor process, speaker structures of different geometric shapes can be fabricated. When supplemented by the application of piezoelectric materials, the integration of active components (e.g., actuators) and passive components (e.g., diaphragms and springs) may be realized on a single wafer. In addition, using the design flexibility provided by microfabrication technology, both the spring stiffness (e.g., spring coefficient) and the quality of the diaphragm (e.g., mass) can be adjusted according to the needs of the speaker application frequency band.

Figure 18:
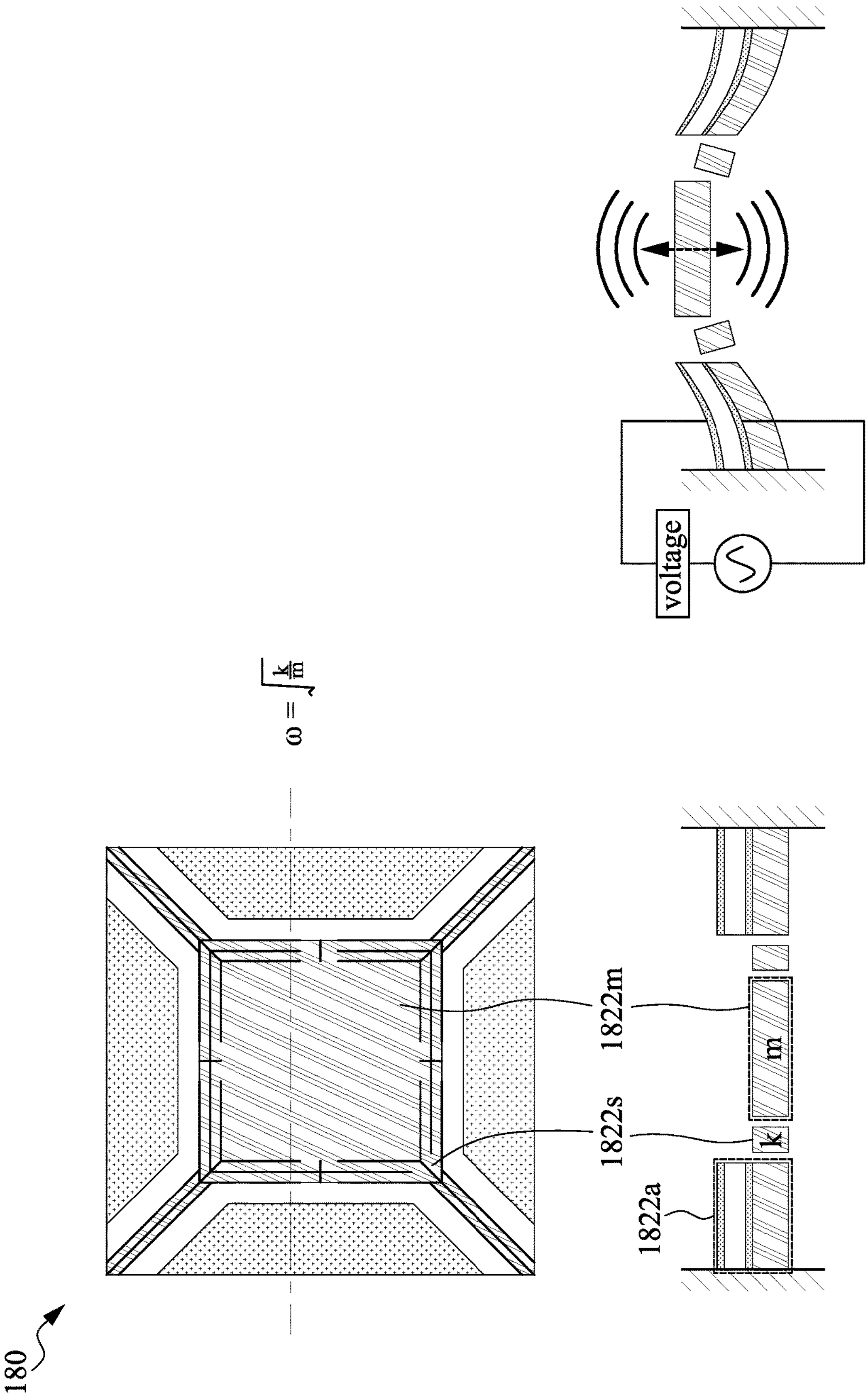
FIG. 18 illustrates various views of a MEMS transducer component for an electro-acoustical transducer device in accordance with some arrangements of this disclosure.

FIG. 18 illustrates various views of a MEMS transducer component for an electro-acoustical transducer device in accordance with some arrangements of this disclosure. For instance, FIG. 18 provides a plane view and a sectional view showing schematic layout arrangements of an exemplary MEMS transducer component 180, as well as a schematic illustration thereof under operation.

From the central to the peripheral regions, the exemplary MEMS transducer component 180 comprises a resonating membrane portion 1822*m* (fabricated with a mass m), a spring portion 1822*s* that is patterned (e.g., through lithography techniques) from a semiconductor material (e.g., silicon), and an driving portion 1822*a* that surrounds and support the spring portion 1822*s* and the resonating membrane portion 1822*m* in a cantilevering configuration.

A driving member (e.g., piezoelectric actuating layer) is arranged over the driving portion 1822*a* and configured to exert a driving force upon receipt of an electric signal to cause vibration of the resonating membrane portion 1822*m* through the spring portion 1822*s*. The driving member laterally extends just shy of the spring portion 1822*s*, such that the spring portion 1822*s* and the resonating membrane portion 1822*m* are substantially free of additional material coverage.

Through micro-fabrication technology of semiconductor process, MEMS structures of different geometric shapes can be fabricated. For instance, by leveraging the design flexibility provided by micro-fabrication technologies, both the spring stiffness (k) and the mass of the membrane (m) can be fine-tuned to meet the frequency band requirement of a specific application.

Figure 19:
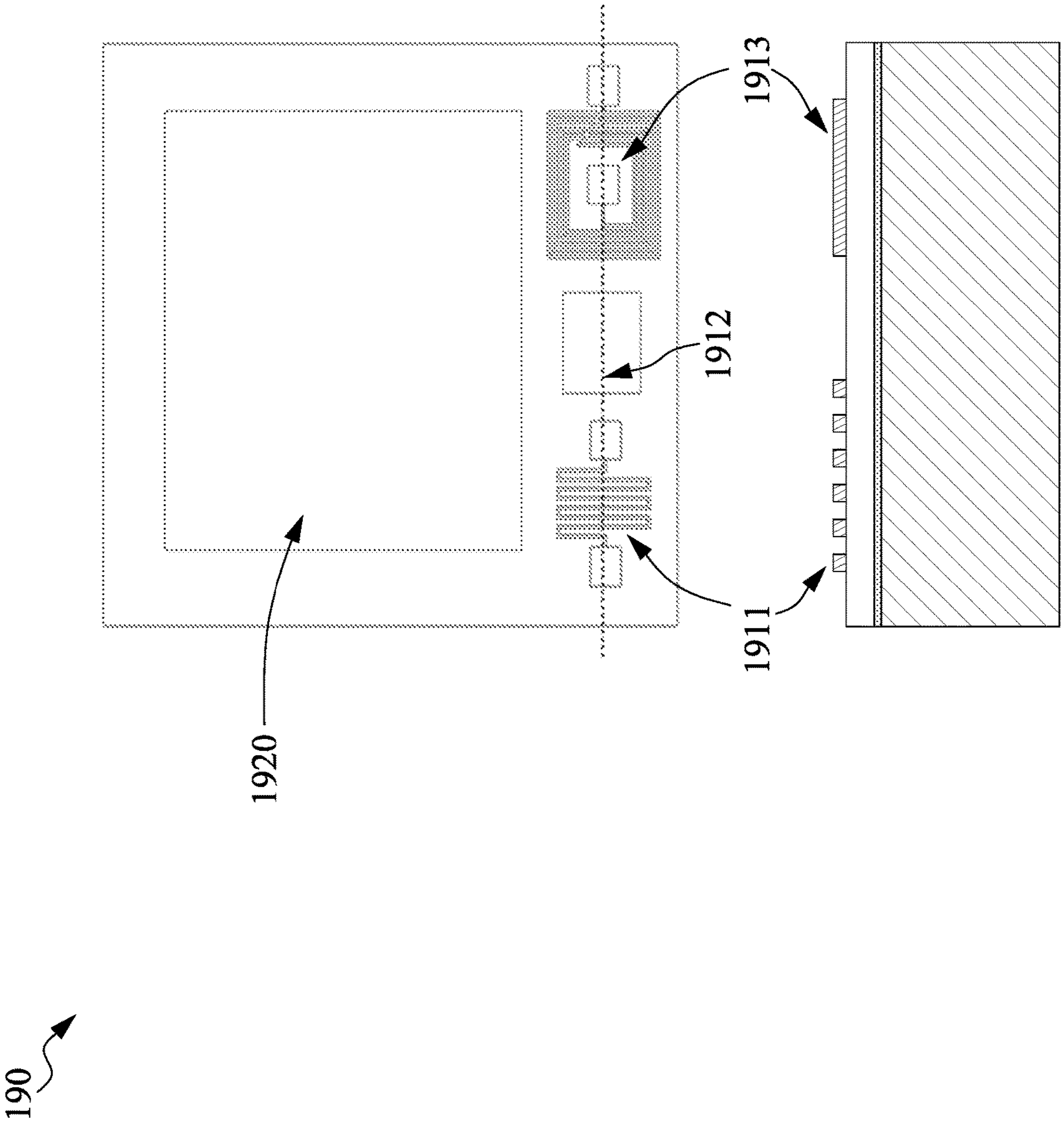
FIG. 19 illustrates various views of a MEMS transducer unit with integrated passive circuit components for an electro-acoustical transducer device in accordance with some arrangements of this disclosure.

FIG. 19 illustrates various views of a MEMS transducer unit with integrated passive circuit components for an electro-acoustical transducer device in accordance with some arrangements of this disclosure. For instance, FIG. 19 illustrates a schematic planar and sectional layouts of an exemplary MEMS transducer device 190. Thanks to the high degree of integration between MEMS device and integrated circuit components, periphery circuit components (e.g., integrated resistor 1911, integrated capacitor 1912, and integrated inductor 1913) may be provided at locations around the MEMS device (e.g., transducer unit 1920) on a same chip surface, thereby increasing utilization of the valuable estate on a chip. Accordingly, the MEMS device 1920 and the associated circuit components 1911, 1912, and 1913 may be integrated on a same chip. The MEMS device 1920 may include a suspended structure as depicted in previous examples, which may be fabricated by semiconductor process (lithography, dry/wet etching, deposition, etc.). On the other hand, supporting circuit components may constitute functional circuit elements (such as a filter) may be arranged on the surface of the MEMS device (or, at least part of the filter structure may be embedded in the MEMS structure).

The supporting circuit components may comprise primarily of passive components such as resistors, capacitors, and inductors, which may also be fabricated by semiconductor process (lithography, dry/wet etching, deposition) process. For instance, resistors may be realized by using upper electrode deposition, lift-off or etching process to create a winding resistor. Likewise, capacitors may be fabricated by using upper electrode deposition, lift-off or etching process to create a fork type capacitor, or form a parallel plate capacitor with the lower electrode. Inductors may be created by using top electrode deposition and etch process to form toroidal coil inductors.

Accordingly, in some arrangements, the instant disclosure provides an electro-acoustical transducer device that may suitably comprise, consist of, or consist essentially of: a hollow disk body that generally defines an axis of propagation, the hollow disk body comprising: a pair of plate members extending substantially perpendicular to the axis of propagation, each provided with a central transmitting port arranged about the axis of propagation, and a peripheral enclosure jointing the pair of plate members at the respective outer edge portions thereof, thereby defining a chamber of resonance between the pair of plate members; wherein a ring-opening about the axis of propagation that enables access to the chamber of resonance is formed between the central transmitting ports of the plate members.

In some arrangements, at least one of the plate members is an active sound generation member In some arrangements, the active sound generation member comprises an piezo-electrical member attached to a resonating plate.

In some arrangements, upon assembly, the piezo-electrical member resides in the chamber of resonance.

In some arrangements, the active sound generation member comprises an unimorph.

In some arrangements, the piezo-electrical member and the resonating plate both comprise substantially annulus planar profiles.

In some arrangements, an outer diameter of the resonating plate is greater than an outer diameter of the piezo-electrical member.

In some arrangements, the piezo-electrical member and the resonating plate are substantially concentrically coupled to each other.

In some arrangements, a ratio between an inner diameter of the resonating plate to the outer diameter thereof is in a range of 1:10 to 1:3.

In some arrangements, the resonating plate comprises a substantially flat central well portion, a base portion arranged opposite the central well portion, an annular lip portion that elevates from the well portion along the direction of the axis of propagation, and a rim portion that surrounds a periphery of the lip portion.

In some arrangements, the piezo-electrical member is coupled to the base portion of the resonating plate, wherein upon assembly, the piezo-electrical member resides outside the chamber of resonance.

In some arrangements, upon assembly, the rim portion of the resonating plate at least partially forms the peripheral enclosure of the hollow disk body.

In some arrangements, the electro-acoustical transducer device further comprises a ring spacer arranged between the pair of plate members, cooperatively forming the chamber of resonance, wherein an outer surface of the ring spacer at least partially forms the outer periphery enclosure of the hollow disk body.

In some arrangements, only one of the pair of the plate member is an active sound generation member, wherein the other one of the plate members is integrally formed as a portion of a transducer casing configured to house the electro-acoustical transducer device.

In some embodiments, the transducer casing is further configured to house an additional active sound generation member, wherein an axis of propagation of the additional active sound generation member is coaxially arranged along the axis of propagation of the electro-acoustical transducer device.

In some embodiments, both of the pair of the plate members are active sound generation member; wherein the peripheral enclosure is integrally formed as a portion of a transducer casing configured to house the electro-acoustical transducer device.

In some embodiments, the chamber of resonance is configured to generate twin peaks in output sound pressure level (SPL) along an output frequency band of the electro-acoustical transducer device.

In some embodiments, a separation distance between the pair of the plate members defines a height (ha) of the chamber of resonance, wherein a ratio between the chamber height (ha) and an outer diameter of the resonating plate is in a range of 1% to 5%.

In some embodiments, the resonating plate comprises a first thickness (t), wherein a ratio between the first thickness (t) and an outer diameter of the resonating plate is in a range of 0.5% to 5%.

In some embodiments, the resonating plate comprises a first thickness, wherein a ratio between the first thickness and an outer diameter of the resonating plate is in a range of 0.5% to 5%.

Accordingly, in some arrangements, the instant disclosure provides an electro-acoustical transducer device that may suitably comprise, consist of, or consist essentially of: a first transducer component comprising a hollow disc body that defines a chamber of resonance, wherein the hollow disc body generally defines an first axis of propagation, the hollow disc body, and includes an active sound generation member provided with a central transmitting port arranged about the first axis of propagation and enabling access to the chamber of resonance; and a second transducer component arranged on the active sound generation member and generally defines a second axis of propagation, wherein the first axis of propagation and the second axis of propagation are substantially in coaxial alignment.

In some arrangements, a central region around the central transmitting port of the active transducer unit is suspended and free from physical hindrance.

In some arrangements, the second transducer component comprises: an driving portion connected to the active sound generation member around the central transmitting port thereof; a spring portion extending from the driving portion, and a resonating membrane portion suspended projectively over the central transmitting port by the spring portion, wherein a thickness of the driving portion is greater than a thickness of the resonating membrane portion.

Those skilled in the art will readily observe that numerous modifications and alterations of the device and method may be made while retaining the teachings of the instant disclosure. Accordingly, the above disclosure should be construed as limited only by the metes and bounds of the appended claims.

What is claimed is:

1. An electro-acoustical transducer device, comprising:

a hollow disc body comprises a disk-shaped main body with an internal hollow portion, and the hollow portion forming a chamber of resonance, wherein the two opposite surfaces of a central area of the hollow disc are respectively provided with central transmitting ports, the hollow disc body further comprising a pair of parallel plate members;

wherein a ring-opening is formed between the opposite central transmitting ports, and the ring-open defines a path for entering and exiting of the chamber of resonance in the hollow disc body; and wherein at least one of the plate members comprises an active sound generation member.

2. The device of claim 1, wherein the active sound generation member comprises an piezoelectric member attached to a resonating plate.

3. The device of claim 2, wherein the piezoelectric member resides in the chamber of resonance.

4. The device of claim 1, wherein the active sound generation member comprises an unimorph.

5. The device of claim 2, wherein the piezoelectric member and the resonating plate both comprise substantially annulus planar profiles;

wherein an outer diameter of the resonating plate is greater than an outer diameter of the piezoelectric member; and wherein the piezoelectric member and the resonating plate are substantially concentrically coupled to each other.

6. The device of claim 5, wherein an ratio between an inner diameter of the resonating plate to the outer diameter thereof is in a range of 1:10 to 1:3.

7. The device of claim 5, wherein the resonating plate comprises a substantially flat central well portion, a base portion arranged opposite the central well portion, an annular lip portion that elevates from the well portion along the direction of the axis of propagation, and a rim portion that surrounds an periphery of the lip portion.

8. The device of claim 7, wherein the piezoelectric member is coupled to the base portion of the resonating plate, wherein the piezoelectric member resides outside the chamber of resonance.

9. The device of claim 7, wherein the rim portion of the resonating plate at least partially forms a peripheral enclosure of the hollow disc body.

10. The device of claim 5, further comprising a ring spacer arranged between the pair of plate members, cooperatively forming the chamber of resonance, wherein an outer surface of the ring spacer at least partially forms an outer periphery enclosure of the hollow disc body.

11. The device of claim 3, wherein only one of the pair of the plate member is the active sound generation member;

wherein the other one of the plate members is integrally formed as a portion of a transducer casing.

12. The device of claim 11, wherein the transducer casing is further configured to house an additional active sound generation member, wherein an axis of propagation of the additional active sound generation member is coaxially arranged along the axis of propagation of the electro-acoustical transducer device.

13. The device of claim 1, wherein both of the pair of the plate members are active sound generation member;

wherein a peripheral enclosure is integrally formed as a portion of a transducer casing configured to house the electro-acoustical transducer device.

14. The device of claim 2, wherein the chamber of resonance is configured to generate twin peaks in output sound pressure level (SPL) along an output frequency band of the electro-acoustical transducer device.

15. The device of claim 14, wherein a separation distance between the pair of the plate members defines a height (ha) of the chamber of resonance, wherein a ratio between the height (ha) and an outer diameter of the resonating plate is in a range of 1% to 5%.

16. The device of claim 14, wherein the resonating plate comprises a first thickness, wherein a ratio between the first thickness and an outer diameter of the resonating plate is in a range of 0.5% to 5%.

17. An electro-acoustical transducer device, comprising:

a first transducer component comprising a hollow disc body that defines a chamber of resonance, wherein the hollow disc body generally defines an first axis of propagation, the hollow disc body includes an active sound generation member provided with a central transmitting port arranged about the first axis of propagation and enabling access to the chamber of resonance; and a second transducer component arranged on the active sound generation member and generally defines a second axis of propagation, wherein the first axis of propagation and the second axis of propagation are substantially in coaxial alignment.

18. The device of claim 17, wherein a central region around the central transmitting port of the active transducer unit is suspended and free from physical hindrance.

19. The device of claim 17, wherein the second transducer component comprises:

a driving portion connected to the active sound generation member around the central transmitting port thereof;

a spring portion extending from the driving portion, and a resonating membrane portion suspended projectively over the central transmitting port by the spring portion, wherein a thickness of the driving portion is greater than a thickness of the resonating membrane portion.

* * * * *